US011969912B2

(12) United States Patent
Pope et al.

(10) Patent No.: US 11,969,912 B2
(45) Date of Patent: Apr. 30, 2024

(54) MODULAR PRESS

(71) Applicant: USNR, LLC, Woodland, WA (US)

(72) Inventors: Samuel Taylor Pope, Lake Oswego, OR (US); Laura Hart Meeker, Portland, OR (US); Conrad Bullion, La Center, WA (US); Kevin K. O'Connell, Portland, OR (US)

(73) Assignee: USNR, LLC, Woodland, WA (US)

(*) Notice: Subject to any disclaimer, the term of this patent is extended or adjusted under 35 U.S.C. 154(b) by 171 days.

(21) Appl. No.: 17/518,276

(22) Filed: Nov. 3, 2021

(65) Prior Publication Data

US 2022/0055246 A1 Feb. 24, 2022

Related U.S. Application Data

(62) Division of application No. 15/994,884, filed on May 31, 2018, now Pat. No. 11,192,275, which is a (Continued)

(51) Int. Cl.

*B30B 1/38* (2006.01)
*B27N 3/20* (2006.01)

(Continued)

(52) U.S. Cl.

CPC ................ *B27N 3/20* (2013.01); *B30B 1/003* (2013.01); *B30B 1/38* (2013.01); *B30B 15/042* (2013.01); *B30B 15/048* (2013.01); *B30B 15/168* (2013.01)

(58) Field of Classification Search

CPC ..... B30B 15/04; B30B 15/041; B30B 15/042; B30B 15/044; B30B 15/047;

(Continued)

(56) References Cited

U.S. PATENT DOCUMENTS 1,013,339 A * 1/1912 Verdin et al. ....... B30B 15/0058 100/231
2,519,984 A * 8/1950 Speaker .................... B30B 1/04 269/224
2006/0090529 A1 5/2006 Katzfuss et al.

FOREIGN PATENT DOCUMENTS

EP 1338408 A2 * 8/2003 ............. B30B 9/225
EP 1800851 A2 6/2007
GB 664434 A 1/1952

OTHER PUBLICATIONS

European Patent Office—Article 94(3) dated Dec. 10, 2021 from European Patent Application No. 16797036.7, 4 pages.

(Continued)

*Primary Examiner* — Jimmy T Nguyen
(74) *Attorney, Agent, or Firm* — Schwabe, Williamson & Wyatt, P.C.

(57) ABSTRACT

A modular press suitable for use in the manufacture of EWC products may include a plurality of frame modules coupled together and aligned along a feed path axis. Each frame module may have a generally planar body supported on a corresponding pair of bases, an elongate aperture, an upper and a lower platform within the aperture, and a platen between the platforms. Optionally, the ends of the aperture may be curved. A first actuator system may be operable to move the platen from a raised position to an intermediate position, and a second actuator system may be operable to press the platen downwardly from the intermediate position onto a workpiece within the aperture. Some modular presses include conveyor rolls and a third actuator system to raise and lower the conveyor rolls. In some embodiments, the actuator systems may be pneumatic actuator systems. Corresponding methods and systems are also described herein.

20 Claims, 18 Drawing Sheets

Related U.S. Application Data division of application No. 15/154,642, filed on May 13, 2016, now Pat. No. 10,011,041.

(60) Provisional application No. 62/204,664, filed on Aug. 13, 2015, provisional application No. 62/162,642, filed on May 15, 2015.

(51) Int. Cl.

*B30B 1/00* (2006.01)
*B30B 15/04* (2006.01)
*B30B 15/06* (2006.01)
*B30B 15/16* (2006.01)

(58) Field of Classification Search

CPC ..... B30B 15/048; B30B 15/168; B30B 1/003; B27N 3/20; B28B 3/08; B21D 1/00; B21D 25/00; F16M 1/02; F16M 11/00; F16M 11/06; F16M 11/08; F16M 11/10; F16M 11/12

USPC ........................................ 100/269.17; 72/455

See application file for complete search history.

(56) References Cited

OTHER PUBLICATIONS

European Patent Office—Article 94(3) dated Jun. 15, 2023 from European Patent Application No. 16797036.7, 5 pages.

* cited by examiner

ROLLS LOWERED

ROLLS RAISED

MODULAR PRESS

CROSS REFERENCE TO RELATED APPLICATION

The present application is a divisional of U.S. patent application Ser. No. 15/994,884, filed May 31, 2018, titled "MODULAR PRESS," which is a divisional of U.S. patent application Ser. No. 15/154,642, filed May 13, 2016, titled "MODULAR PRESS," which claims priority to U.S. Patent Application No. 62/162,642, filed May 15, 2015 and U.S. Patent Application No. 62/204,664, filed Aug. 13, 2015, both titled "MODULAR PRESS," the entire disclosures of which are incorporated by reference herein.

BACKGROUND

Structural composites are increasingly popular alternatives to traditional construction materials. Engineered wood/cellulosic (EWC) products, a type of structural composite, are typically manufactured by binding strands of wood or vegetable fiber with an adhesive under pressure. Sawmill scraps and wood that is structurally weak in its natural state can be used to make EWC products that are lighter and/or stronger than natural wood. Such products can be manufactured in a variety of sizes and configurations tailored to the end use. Some EWC products, such as glue laminated timber (glulam) and cross-laminated timber (CLT), may be used in place of natural lumber and steel.

EWC products may reduce demand for large logs from older-growth trees and provide opportunities to use smaller trees more efficiently. However, in some cases these benefits may be offset by higher manufacturing costs and the potential environmental impacts of manufacturing processes.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
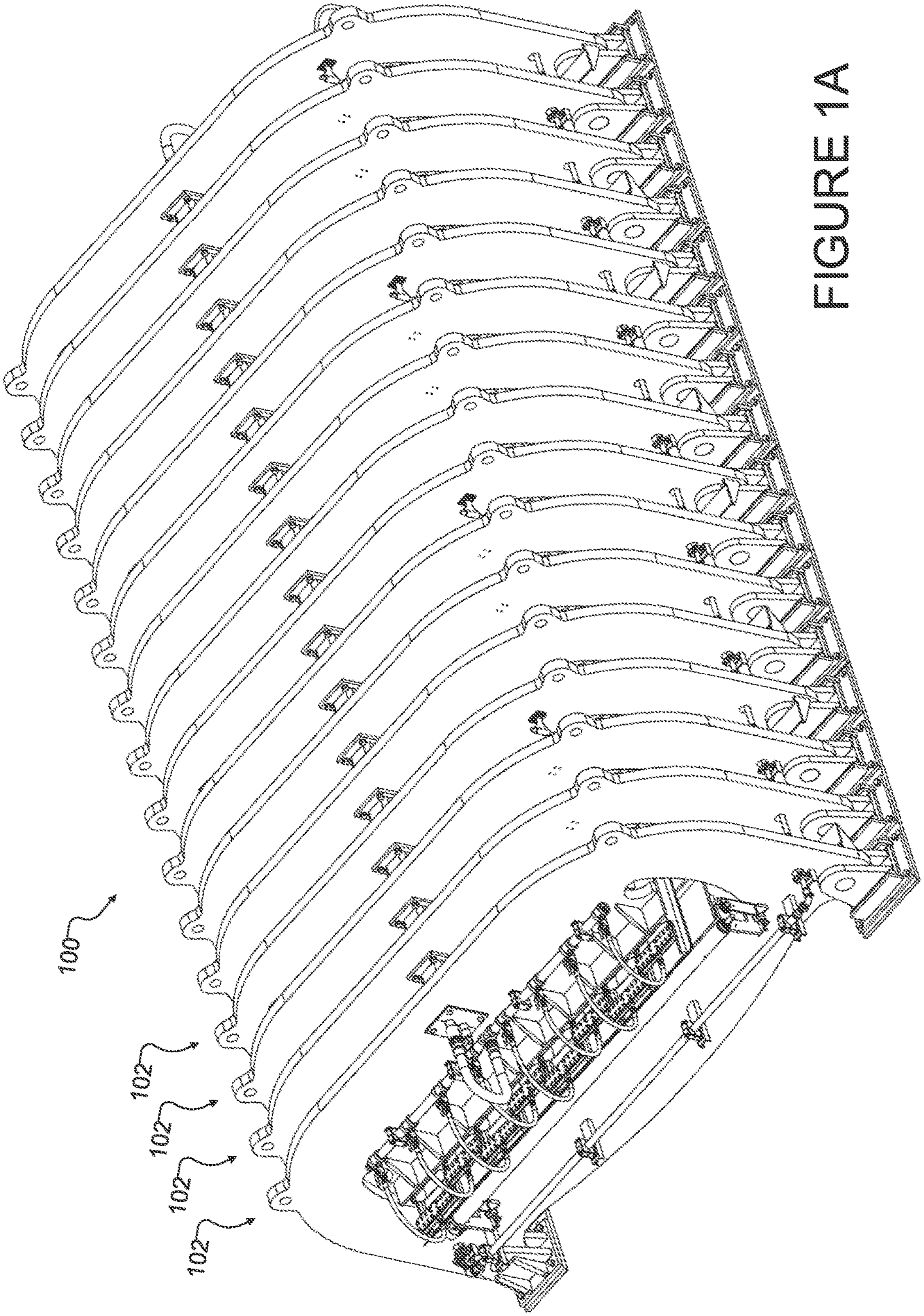
FIGS. 1A-B illustrate perspective and plan views, respectively, of an embodiment of a modular press.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computing device may be endowed with one or more components of the disclosed apparatuses and/or systems and may be employed to perform one or more methods as disclosed herein.

Embodiments of a modular press suitable for use in the manufacture of EWC products are described herein. In various embodiments, a modular press may include one or more frame modules coupled together in series to form a press frame. Each frame module may have a generally planar body supported at opposite ends on a corresponding pair of bases, an interior edge that defines an opening, and an upper and a lower platform coupled to corresponding portions of the interior edge, respectively, such that the platforms extend through the opening generally perpendicular to the plane of the body. Collectively, the interior edge and the upper and lower platforms may define an aperture through which workpieces can be inserted for pressing. The aperture may have a middle portion that extends between the adjacent outer faces of the upper and lower platforms and end portions defined by the interior edge of the body. In various embodiments, the end portions of aperture may be curved.

In some embodiments, each of the end portions may be defined by a multiradial curve, such as a continuous, discontinuous, or mirror multiradial curve. As used herein, the term "multiradial curve" means any curve that includes two or more circular arcs, at least some of which have different radii, that are joined end-to-end. The term "continuous multiradial curve" means a curve that includes two or more circular arcs of different radii, joined tangentially without reversal of curvature. The term "discontinuous multiradial curve" means a curve that includes two or more circular arcs, at least some of which have different radii, and at least some of which are joined non-tangentially (i.e., joined at some point that is not along a common tangent). The term "mirror multiradial curve" means a multiradial curve that is symmetrical about a plane.

A platen assembly may be coupled with some or all of the frame modules. The platen assembly may include a platen disposed within the aperture and a first actuator system operable to move the platen vertically between a raised position and an intermediate, or pre-engagement, position. The platen assembly may further include a second actuator system with actuators disposed between the platen and the upper platform. The second actuator system may be operable to force the platen downwardly from the intermediate position to an engagement position to thereby press a workpiece between the platen and the lower platform.

In various embodiments, a modular press may include a transport system that is selectively operable to move workpieces into, and through, the aperture. Optionally, the transport system may include a plurality of driven conveyor rolls disposed between the lower platforms of adjacent frame modules and a third actuator system selectively actuable to raise and lower the conveyor rolls relative to the lower platform.

In some embodiments, some or all of the actuator systems may be pneumatic actuator systems. The first actuator system may include one or more air bags supported on a body/upper platform, a beam supported on the air bags, and a pair of rods disposed through opposite ends of the beam. One end of the rods may be connected to the platen, and the opposite ends of the rods may be movably coupled to the corresponding body. The second actuator system may include a plurality of pneumatic hoses (e.g., water discharge hoses) supported on the platen and arranged generally parallel to a feed path axis that extends through a center of the apertures. The third actuator system may include a plurality of air bags that can be selectively inflated and deflated to raise and lower the conveyor rolls relative to the top surfaces of the lower platforms.

Any number of frame modules may be coupled together in series with corresponding platen assembly components (and optionally, with transport assembly components) to form a modular press of a desired length for processing EWC products of various dimensions. A modular press may be designed to apply a desired pressure (e.g., 150 psi or 100 psi), and/or pressures within a particular range (e.g., 150-250 psi, 100-200 psi, 100-150 psi, 50-100 psi, or 50-250 psi), to a workpiece for a desired length of time.

Figure 1B:
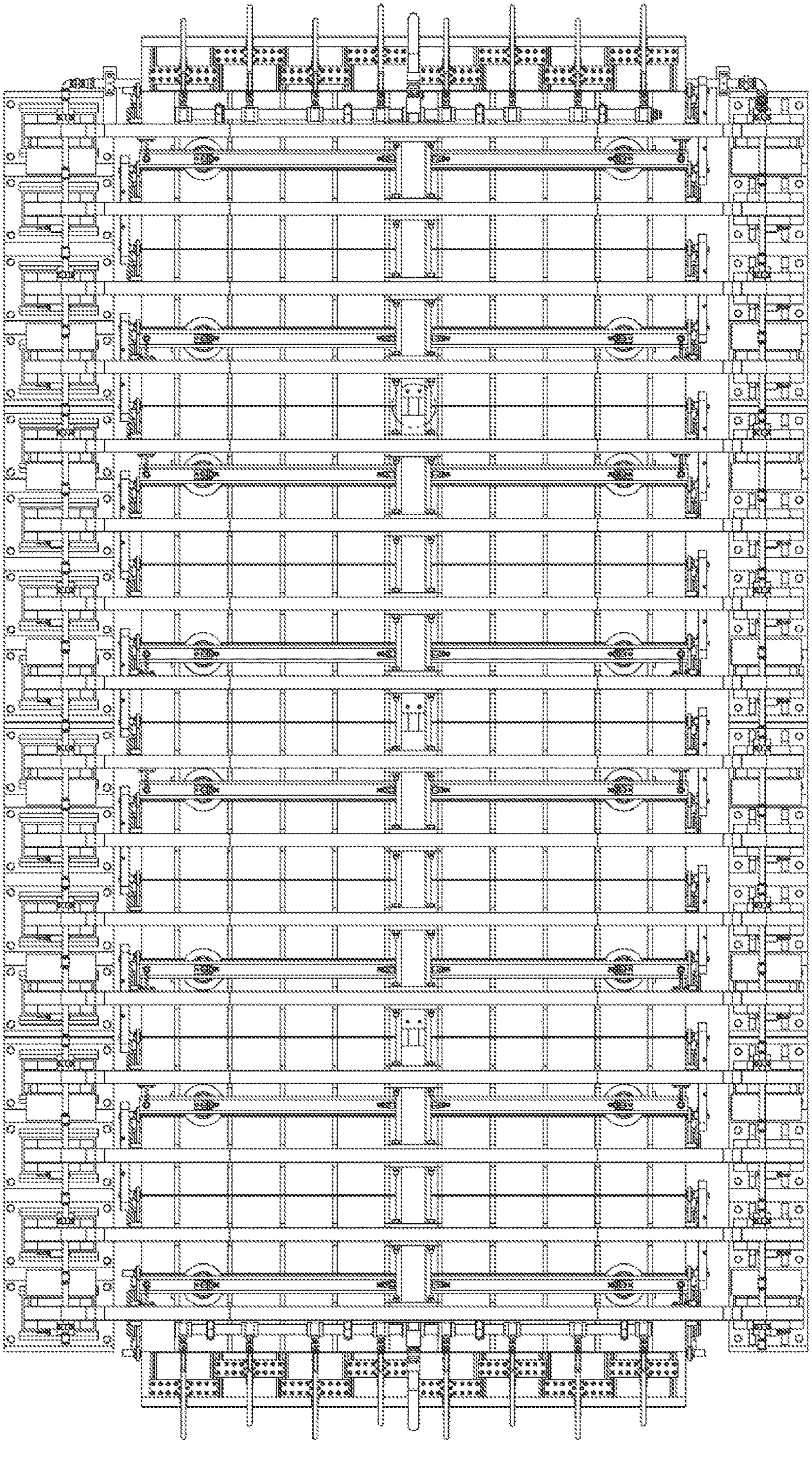

An embodiment of a modular press 100 with a plurality of frame modules 102 is illustrated by way of example in FIG. 1. In various embodiments, modular press 100 may include a plurality of frame modules 102 coupled together in series to form a press frame of a desired length. Modular press 100 may further include one or more platen assemblies and/or transport assemblies with corresponding actuator systems, each described further below. In some embodiments, the primary and secondary actuator systems and the conveyor actuator system are pneumatic actuator systems, as described in further detail below. In other embodiments modular press 100 may have hydraulic, electric, mechanical, or other types of actuators instead of, or in addition to, pneumatic actuators. Some modular presses with pneumatic actuator systems, such as the modular press illustrated in FIG. 1, may be operable to press workpieces at 150 psi. Others may be designed to press workpieces at another desired pressure (e.g., 100 or 200 psi).

Frame Modules

Figure 2:
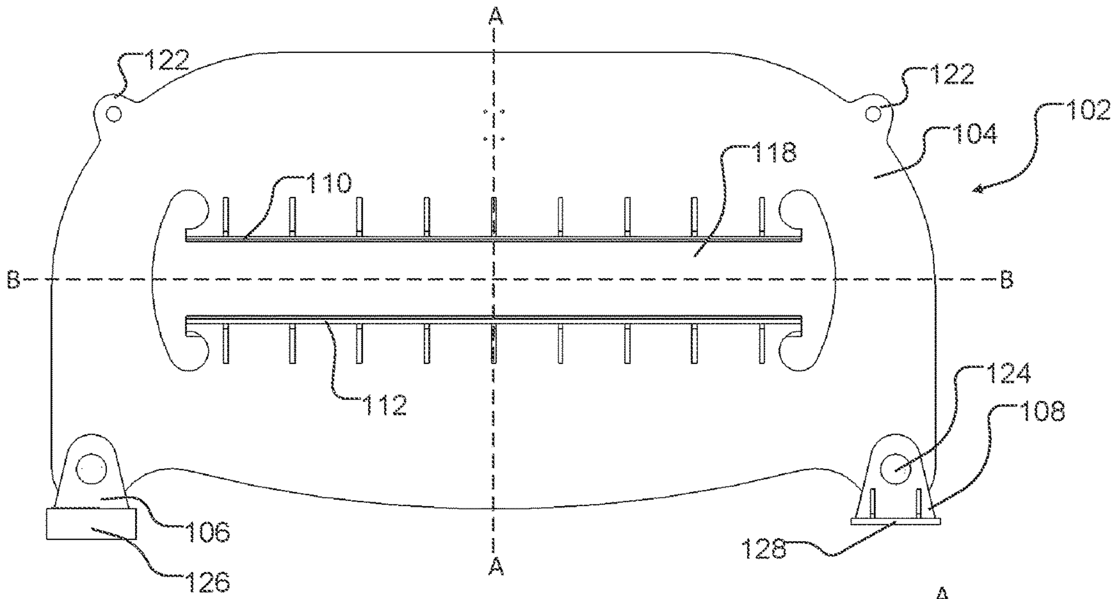
FIG. 2 illustrates a front elevational view of a frame module.
Figure 3:
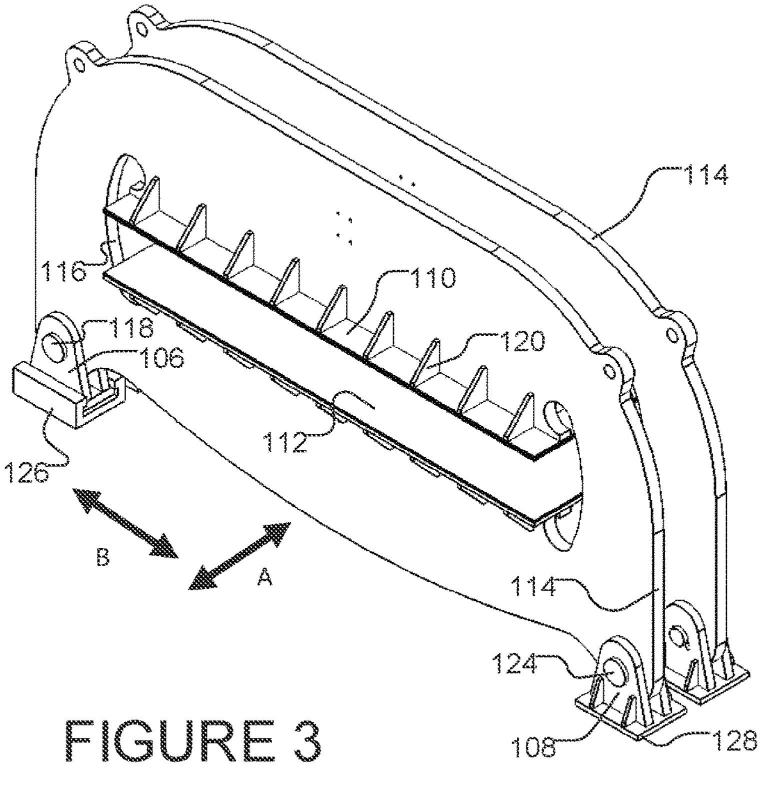
FIG. 3 illustrates a perspective view two frame modules arranged in series.
Figure 4:
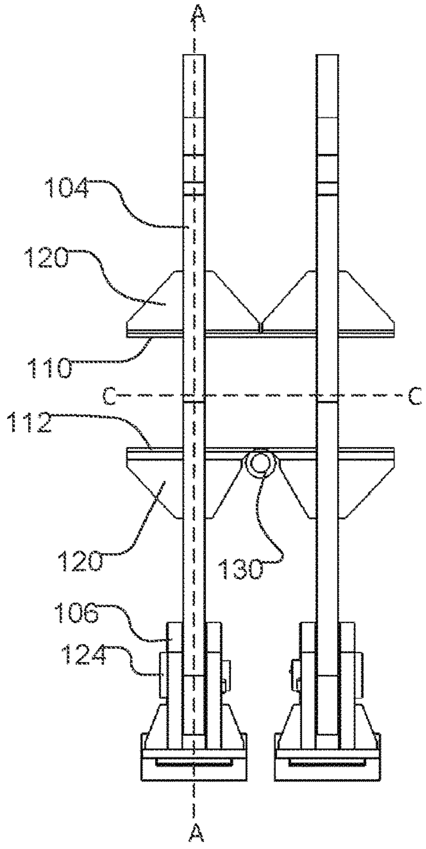
FIG. 4 illustrates a side elevational view of two frame modules arranged in series.

Referring now to FIGS. 2-4, a frame module 102 may include a body 104 supported at opposite ends on bases 106 and 108, an upper platform 110, and a lower platform 112. Body 104 may have opposite faces, an outer edge 114, and an inner edge 116 that defines an opening through the body. Upper platform 110 and lower platform 112 may be vertically spaced apart within the opening and coupled to the body along corresponding portions of inner edge 116. Collectively, inner edge 116 and platforms 110, 112 may define an aperture 118. In some embodiments, frame module 102 may also include a plurality of supports 120 coupled to upper/lower platform(s) 110/112 and body 104 to provide additional support (see FIGS. 7A-B). Optionally, body 104 may also include couplers 122 configured for attachment to a winch, crane, or other such machinery for use to lift or move body 104 and/or frame module 102. As shown for example in FIG. 4, some frame modules 102 may include a conveyor roll 130, as described in further detail below with regard to FIGS. 14A-17B.

Figure 7A:
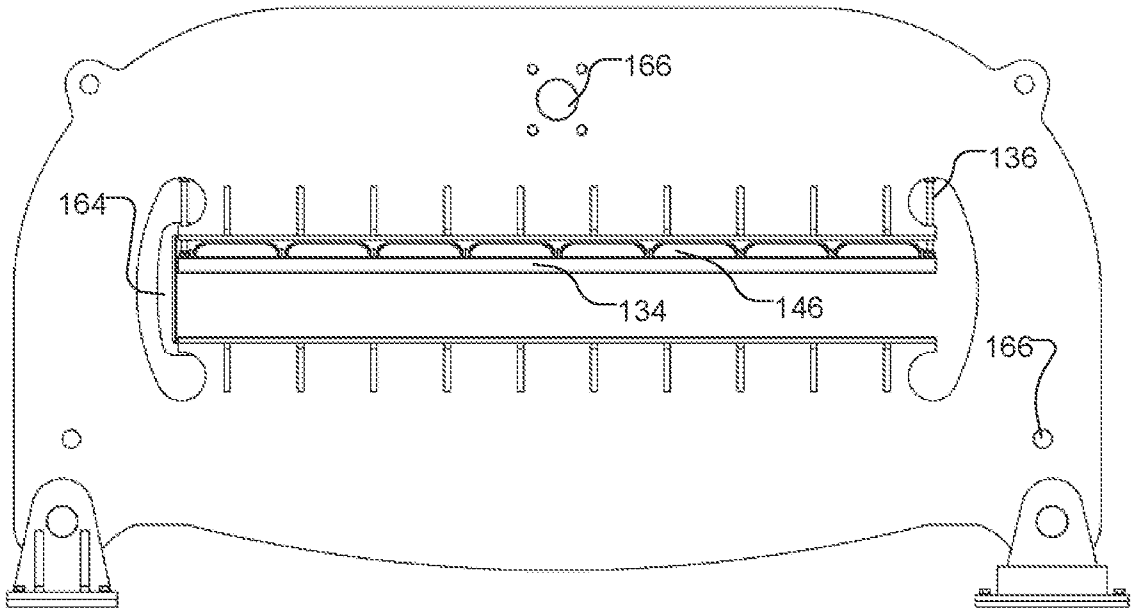
FIGS. 7A-B illustrate schematic views of a frame module with the platen raised (FIG. 7A) and lowered (FIG. 7B)
Figure 7B:
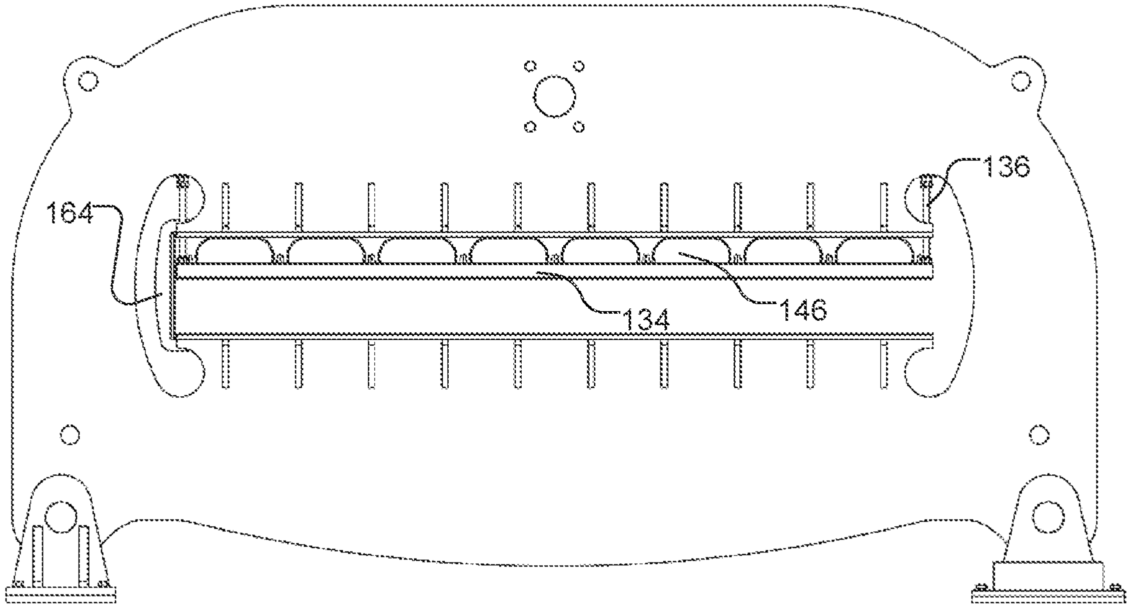

In some embodiments frame module 102 may also include an abutment member 164 rigidly coupled to the platforms 110, 112 and/or body 104 (e.g., by welds or bolts) to provide a surface against which a workpiece can be positioned and/or pushed (FIGS. 7A-B). Pushing workpieces laterally against abutment member 164 before/during the pressing operation may help to reduce gaps within the workpiece. For example, some workpieces may have a layer of pieces (e.g., boards, strips, or the like) arranged generally parallel to the feed path axis, and the workpiece may be pushed laterally against abutment member 164 to press the pieces together, thereby reducing gaps between the pieces within that layer. Similarly, workpieces that include multiple layers stacked vertically onto one another may be pushed laterally against abutment member 164 to even-end or align the layers along one side of the workpiece, thus reducing gaps between vertically adjacent layers along that side of the workpiece.

Abutment member 164 may be configured to provide an abutment surface that is substantially planar and orthogonal to the platforms 110, 112. Alternatively, abutment member 164 may be configured to provide an abutment surface that defines a desired profile, such as a splined, lapped, or other interlocking profile for joining workpieces together. Thus, in some embodiments the abutment surface may define at least one ridge, notch, groove, recess, or other such feature to be formed along the side of the workpiece.

Optionally, a frame module 102 may be provided with an abutment member 164 near one end of aperture 118 and a horizontal actuator (e.g., an air cylinder; not shown) near the opposite end of aperture 118, and the horizontal actuator may be selectively actuable to provide lateral force or "side squeeze" to force the workpiece laterally against abutment member 164. In various embodiments, abutment member 164 may include a plate member and one or more brackets or braces that are configured to be coupled to the upper surface of upper platform 110 and the bottom surface of lower platform 112 to hold the plate member in position while avoiding interference with platen 134 (see e.g., FIGS. 12C-D). Other embodiments may lack abutment member 164.

In various embodiments, frame module 102 may include one or more holes 166 through which air/fluid conduits, electrical wiring, or other components may be inserted. The number, shape, and dimensions of holes 166 may vary among embodiments. Optionally, body 102 may lack hole(s) 166.

Referring again to FIGS. 2-4, body 104 may be constructed from a single plate of steel or other suitable material. For example, body 104 may be constructed from a single plate of steel with a thickness of approximately 2-10 inches. In other embodiments, body 104 may be constructed from a plate of steel with a thickness of 2-3 inches. In still other embodiments, body 104 may be constructed from multiple plates of steel, and/or from another material, in any thickness suitable for the intended application and material used. For example, in a press designed to operate at 150 pounds per square inch (psi), body 104 may be 3 inches thick, and in a press designed to operate at 100 psi, body 104 may be 2 inches thick. Thus, the thickness or other dimensions of body 104 and other components of press 100 may vary among embodiments.

Body 104 may be generally rectangular/ovoid and elongate, such that the width of body 104 is greater than the height. In some embodiments, body 104 may be generally rectangular with rounded corners. In various embodiments, some or all of the adjacent sides may be joined by rounded corners. Referring to FIG. 2, body 104 may have a vertical center axis A-A and a longitudinal axis B-B that extend through the plane of body 104. Optionally, body 104, aperture 118, and/or frame module 102 may be symmetrical about one or both of axes A-A and B-B. As best shown in FIG. 4, feed path axis C-C may extend through aperture 118, orthogonal to the plane of body 104.

Body 104 may be substantially ovoid in some embodiments. Alternatively, body 104 may be generally rectangular with two or more rounded corners. The bottom edge of body 104 may be curved, with downward projections at opposite ends thereof, in some embodiments.

Aperture 118 may have any suitable shape or size. Typically, aperture 118 is elongate and defined collectively by upper platform 110, lower platform 112, and inner edge 116 of body 104. Aperture 118 is typically, but need not be, wider than upper plate 110 and/or lower plate 112. In some embodiments, aperture 118 may have a middle portion and two end portions. The middle portion may be disposed between upper and lower platforms 110, 112, such that the middle portion is defined by the outer face of each of the platforms 110, 112. The two end portions may be disposed at opposite ends of the middle portion, such that the two end portions are defined by the inner edge 116 of body 104, and optionally also by the ends of platforms 110, 112 (see e.g., FIG. 3).

Aperture 118 may be generally rectangular in some embodiments. Alternatively, the end portions of aperture 118 may be curved. In various embodiments, the end portions of aperture 118 and/or the outer contours of body 104 may be curved to distribute stress over a larger surface to thereby reduce or mitigate stress. The type, location, and degree of curvature may vary among embodiments.

In various embodiments, the end portions of aperture 118 and/or corresponding portions of the outer contour of body 104 may be curved. For example, in some embodiments the end portions of aperture 118 curve outwardly, such that the aperture 118 is wider along its longitudinal center (e.g., along Axis B-B of FIG. 2) than in the planes of the upper and lower plates 110, 112. In some embodiments, each of the end portions of aperture 118 may be defined by a multiradial curve. The multiradial curve may be a continuous multiradial curve, a discontinuous multiradial curve, or a mirror multiradial curve.

In some embodiments, as illustrated for example in FIGS. 2-3, each end portion of aperture 118 may be defined by a mirror multiradial curve with a generally horizontal plane of symmetry. The plane of symmetry may be along the longitudinal centerline of the aperture 118 (Axis B-B, FIG. 2), equidistant between the upper and lower platforms 110, 112. Each mirror multiradial curve may include a first arc with a radius located above the upper platform 110, a second arc with a radius located along the plane of symmetry, and a third arc with a radius located below the lower platform 112, with the radii of the first and third arcs in vertical alignment. In this configuration, aperture 118 is widest along the plane of symmetry between the upper and lower platforms 110 and 112, and the end portions of aperture 118 have a 'curved barbell' shape and a greater vertical height than the middle portion of aperture 118.

The outer contour of the body 104 may be linear, curvilinear, or a combination of linear and curvilinear portions. For example, as shown in FIGS. 2-3, in some embodiments the outer contour of body 104 may be generally flat/linear along portions of the top and ends, and curved along the bottom and between the top and each of the ends. Optionally, the opposite ends and bottom of body 104 may define a pair of downward projections.

In various embodiments, body 104 may be pivotably coupled to one or both of bases 106, 108, such as by a corresponding pivot member 124. Pivot member 124 may be disposed through body 104 (e.g., through the downward projections) and/or through the corresponding base 106 or 108. Optionally, as best shown in FIG. 3, base 106 may be supported on a pedestal 126. Pedestal 126 may be configured to permit lateral movement of base 106 in a first direction (FIG. 3, Arrow B) that lies in the plane of body 104, and to restrict movement of base 106 in a second direction (FIG. 3, Arrow A) that is perpendicular to the first direction and parallel to the feed path axis. Base 108 may be supported on a second pedestal 126. Alternatively, base 108 may be supported on a base support 128 configured to fixedly attach base 108 to a floor or other underlying support surface, such as by welding and/or bolts or other fasteners. Other embodiments may lack any or all of bases 106, 108, pivot member 124, and/or pedestal 126.

Each of the upper and lower platforms 110, 112 may include one or more plates of steel or other suitable material. In some embodiments, one or both of upper and lower platforms 110, 112 may include two or more layers of material. For example, lower platform 112 may include a steel plate and one or more additional plates or layers disposed on the steel plate. Optionally, lower platform 112 and/or other components of modular press 100 may include a layer or coating of polytetrafluoroethylene (PTFE), perfluoroalkoxy (PFA), Fluorinated ethylene propylene (FEP), anodized aluminium, ceramic, silicone, or other non-stick and/or low-friction material to reduce adhesion of CWE materials to the press.

Couplers 122 may be, or may include, one or more through-holes through body 104. In some embodiments, a coupler 122 may include a projection in the outer periphery of body 104 and a through-hole through the projection. In other embodiments, couplers 122 may include other features integral to body 104, such as grooves, projections, textured surfaces, or other such features. Alternatively, couplers 122 may include ring bolts or other fasteners attached to body 104 by welding, threaded connections, or in any suitable manner.

Multiple frame modules 102 may be coupled together in series to form a press frame of a desired length. The upper platforms 110 may collectively form an upper platform assembly, and the lower platforms 112 may collectively form a lower platform assembly. A platen assembly may be coupled with some or all of the frame modules 102, as described below.

Platen Assembly

Figure 5:
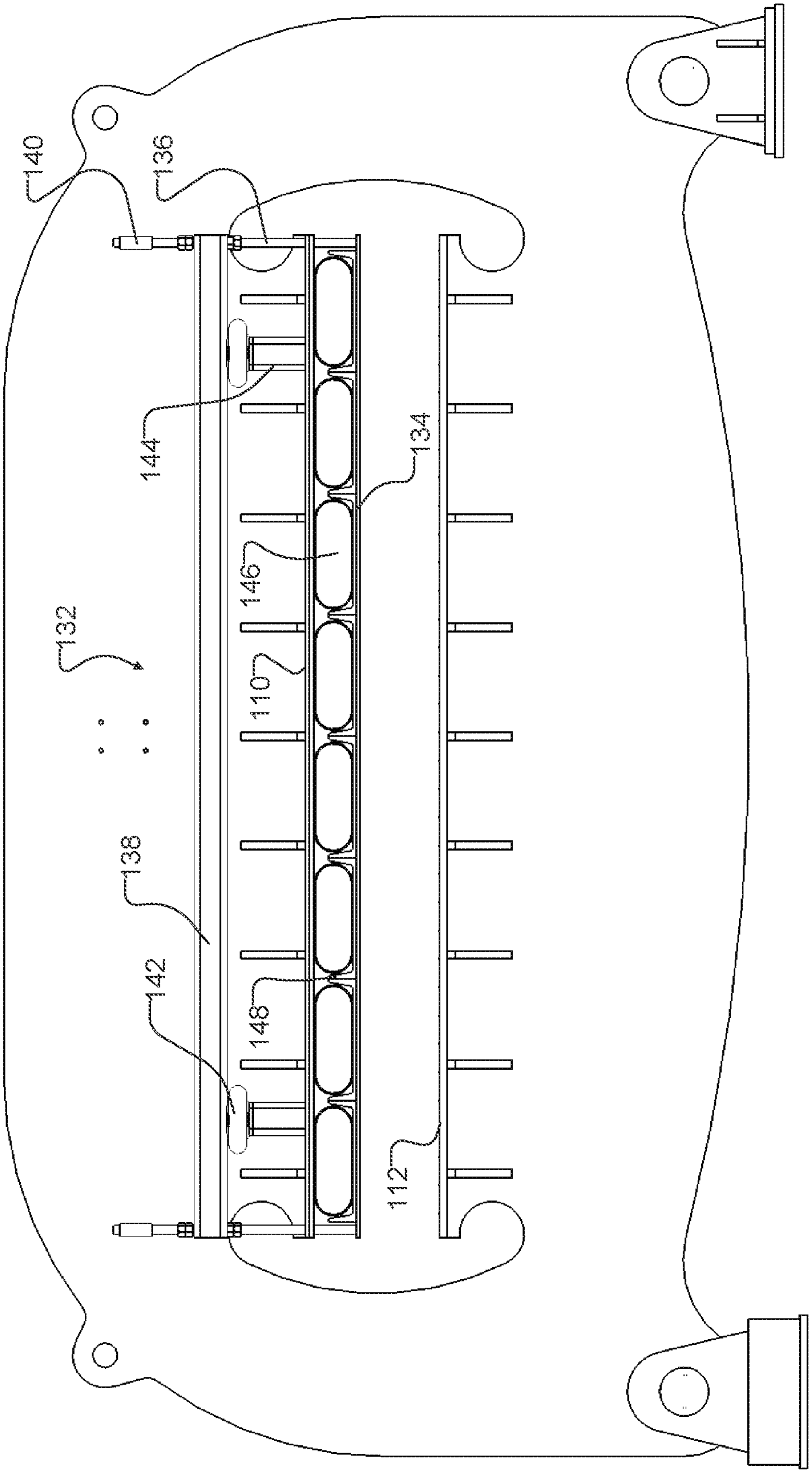
FIG. 5 illustrates a front elevational view of a platen assembly for a modular press.
Figure 6A:
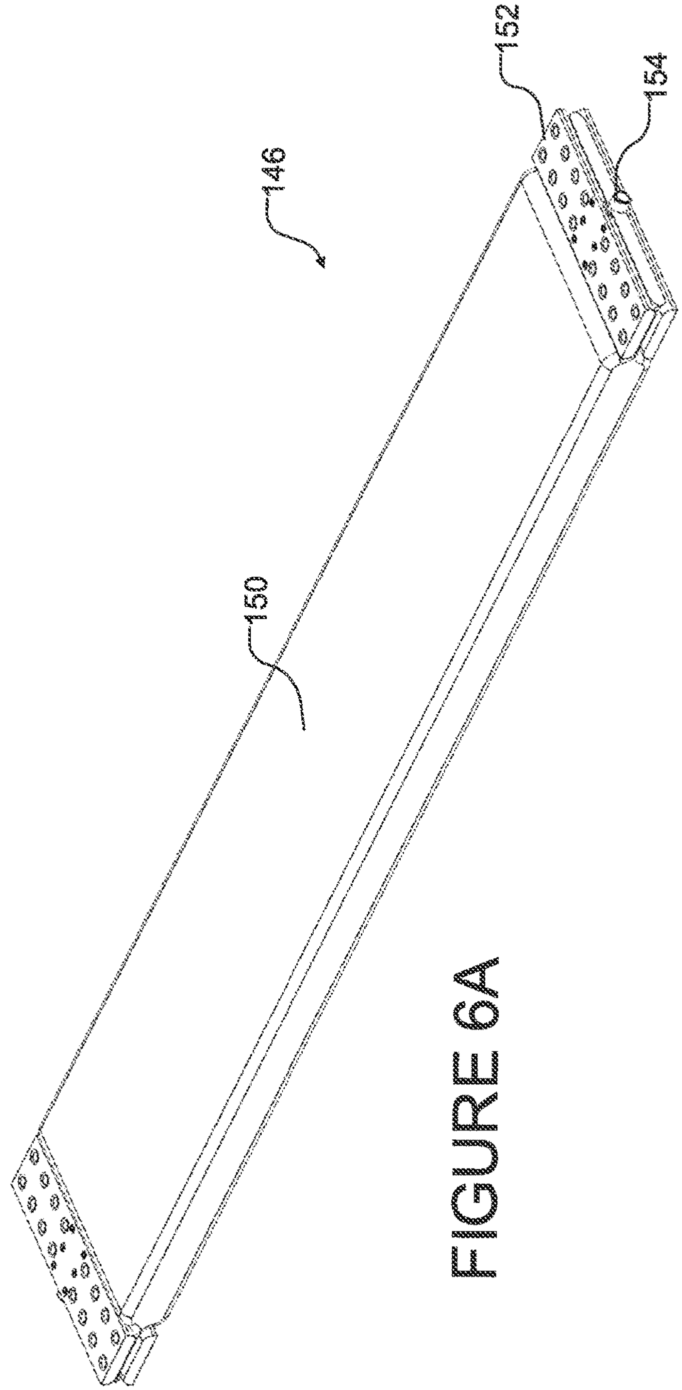
FIGS. 6A-B illustrate perspective views of components of a platen assembly for a modular press.
Figure 6B:
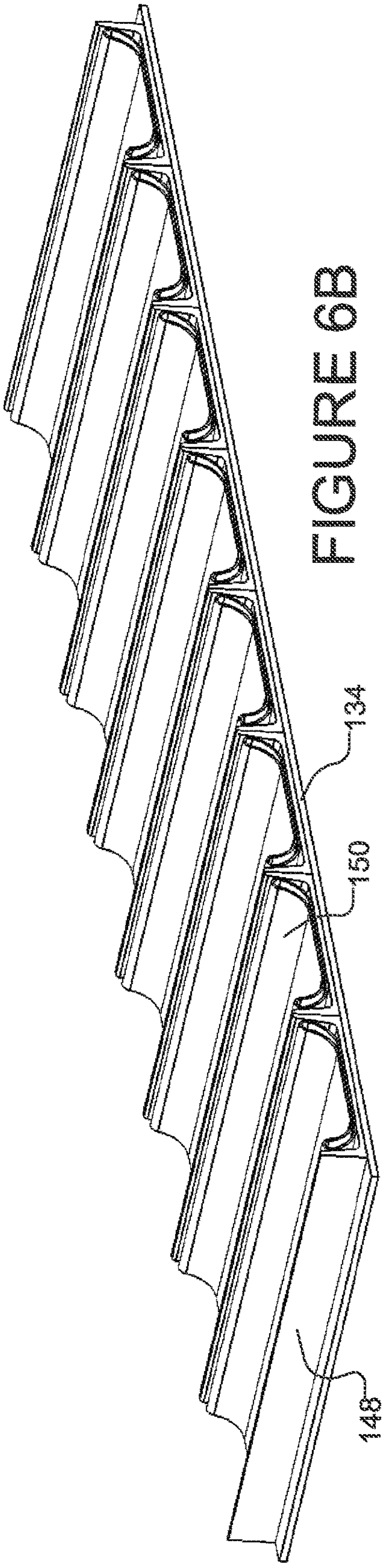

FIGS. 5 and 6A-B illustrate views of a platen assembly and components thereof for a modular press, in accordance with various embodiments.

Referring first to FIG. 5, a platen assembly 132 may include a platen 134 and a beam 138 rigidly coupled together by rods 136, which may be movably coupled to frame module 102 by retaining members 140. Platen assembly 132 may further include actuators 142 and 146, and corresponding supports 144 and 148, respectively.

Platen 134 may be disposed below, and generally parallel to, upper platform 110, and may extend generally parallel to the feed path axis through some or all of the apertures 118 of frame modules 102. Platen 134 may be connected to a first end of rods 136, which may extend upwardly through corresponding portions of beam 138 to retaining members 140, which may be coupled to frame module 102 (e.g., affixed to body 104). The second ends of rods 136 may be slideable within retaining members 140. Beam 138 may be rigidly coupled to rods 136, and thus to platen 134, such that the beam, rods, and platen are vertically moveable as a single unit.

Actuators 142 may be coupled at opposite ends to beam 138 and corresponding supports 144. Supports 144 may be supported on upper platform 110 and/or rigidly coupled to body 104. Actuators 142 may be selectively extended or expanded to force beam 138 vertically upward, away from supports 144, to thereby lift platen 134 toward upper platform 110 and into a raised position. Actuators 142 may also be retractable and/or deflatable to thereby lower platen toward lower platform 112 and into an intermediate position, in which the platen is near or in contact with a workpiece on lower platform 112.

Actuators 146 may be disposed below upper platform 110 on supports 148, which may in turn be supported on an upper surface of platen 134. Actuators 146 may be selectively extendable or expandable to force platen 134 downwardly from the intermediate position to an engagement position, in which platen 134 is pressing against an upper surface of a workpiece on lower platform 112. Actuators 146 may also be selectively retractable and/or deflatable to thereby allow platen 134 to return to the intermediate position.

Actuators 142 and 146 may be pneumatic, hydraulic, electric, mechanical, or any other suitable type of actuator, alone or in any combination. Examples of such actuators include, but are not limited to, air cylinders, pneumatic cylinders, electric motor ball screws, planetary screws, springs, and eccentric wheels.

In some embodiments, as illustrated by way of example in FIG. 5, actuators 142 may include airbags and actuators 146 may include pneumatic hoses. Water discharge hoses of the type used in mining/fracking operations may be suitable for use as the pneumatic hoses. For example, an actuator 146 may include a length of hose 150 (e.g., a length of water discharge hose) sealed at opposite ends by clamps 152. In some embodiments, clamps 152 may include a pair of plates coupled together by screws, bolts, outer bands, or the like, with the end of the hose between them. A port 154 may be provided at one or both of the ends to provide passage(s) through clamp 152 for airflow into and out of the hose 150. Alternatively, the ends of the hose 150 may be completely sealed (e.g., by clamps 152 or other means), and port 154 may be provided in any suitable location along hose 150. Ports 154 may optionally include valves that are selectively operable to block and unblock the ports. In various embodiments port 154 may include a valve fitting such as a valve stem or any other type of partially or fully self-contained valve. In a particular example, the ends of the hose 150 are completely sealed (e.g., by clamps or other means), and a valve-stem like fitting is disposed through a wall of the hose proximal to the clamps.

In some embodiments supports 148 may be channel members formed from sheets of steel or other suitable material(s) (FIG. 6B). The channel members may be disposed on platen 134, and actuators 146 may be disposed within corresponding ones of the channel members. The channel members and actuators 146 may be oriented generally parallel to the feed path axis and extend through the apertures 118 of multiple frame modules 102. Alternatively, other embodiments may have channel members and actuators 146 that are oriented transverse to the feed path axis.

Figure 8:
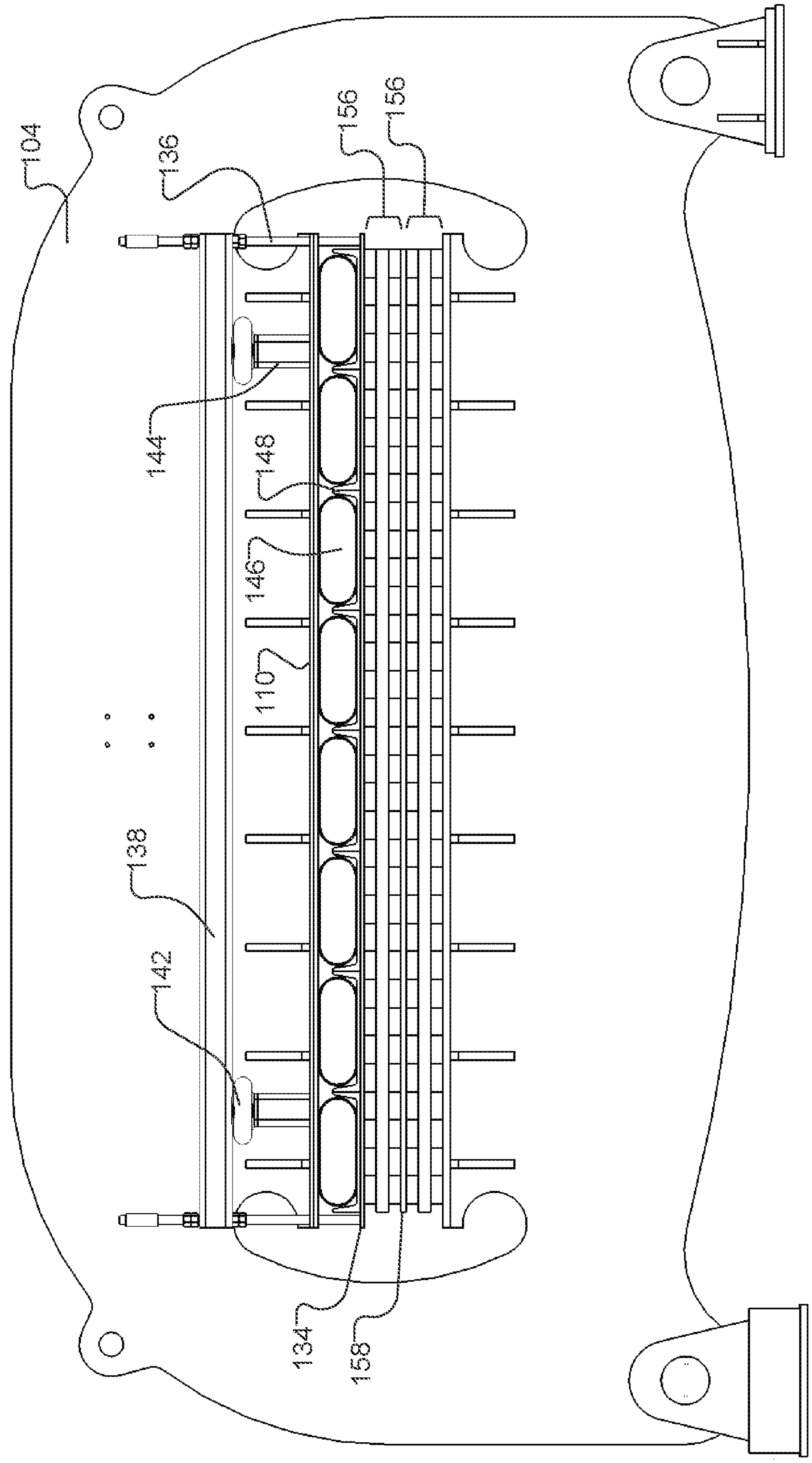
FIG. 8 illustrates a schematic view of a frame module in use.

In operation, a press cycle may begin with actuators 142 extended, expanded, or inflated, such that platen 134 is in the raised position (FIG. 7A). A workpiece may be placed or conveyed into the apertures 118 to rest on lower platform 112. Actuators 142 may be actuated (e.g., retracted or deflated) to move platen 134 vertically downward toward lower platform 112 and into the intermediate position, in which platen 134 may be near or in contact with an upper surface of the workpiece. (Actuators 142 may be actuated before, during, or after placement of the workpiece onto lower platform 112.) With the workpiece positioned on lower platform 112 and platen 134 in the intermediate position, actuators 146 may be extended, expanded, or inflated to press platen 134 downwardly from the intermediate position to an engaging position (FIG. 7B), in which platen 134 is pressing downwardly against the workpiece (FIG. 8). The pressure may be maintained for a desired length of time. Actuators 146 may be retracted or deflated to allow platen 134 to return to the intermediate position, and actuators 142 may be extended, expanded, or inflated to raise platen 134 to the raised position, completing the press cycle. In various embodiments, actuators 146 may be retracted/deflated before actuators 142 are expanded/extended/inflated. Alternatively, actuators 146 and 142 may be actuated simultaneously.

In some embodiments, modular press 100 and/or components thereof may be dimensioned and/or configured to accommodate a stack of two or more workpieces. For example, as shown in FIG. 8, a divider 158 may be placed onto the upper surface of a workpiece 156 and another workpiece 156 may be placed onto divider 158 to thereby form a stack of workpieces. The stack may be inserted into the modular press and pressed in the same or similar manner as a single workpiece. Optionally, divider 158 may include one or more sheets, layers, and/or coating of a non-stick or low-friction material such as PTFE, PFA, FEP, anodized aluminium, ceramic, silicone, or other material to reduce adhesion of the workpieces to one another. Processing multiple workpieces in a single press cycle may allow better operational efficiency and/or profitability than processing workpieces singly in separate cycles.

Similarly, a modular press may be used to press either one full-length, full-width workpiece or multiple smaller workpieces in a single press cycle. For example, a modular press may be used to press two full-length, half-width workpieces placed side by side within the press, or two half-length, full-width workpieces placed end to end within the press, or four half-length, half-width workpieces, or other such combinations. Optionally one or more end spacers, side spacers, or some combination thereof may be placed within the press near the smaller workpiece(s) to help distribute the pressing force along the smaller workpiece(s). For example, a modular press may be used to press two full-length, one-third-width workpieces placed side by side within the press with a one-third-width spacer between them or along one side. Likewise, a modular press may be used to press two one-third-length, full-width workpieces placed end to end within the press with a one-third-length spacer between them. Many other combinations of workpieces and spacers are possible and will be readily apparent to those skilled in the art. Again, one or more dividers such as non-stick sheets or coatings may be used between/on workpieces to reduce adhesion of the workpieces to the press and/or to one another.

Optionally, bodies 104 and/or apertures 118 may be manufactured in sizes and shapes that are tailored to the dimensions of desired products. For example, if the desired products are 3.5 inches thick and 7.0 inches thick, bodies 104 and/or apertures 118 may be configured for use to press workpieces that are 7.0 inches thick, 14.0 inches thick, 21.0 inches thick, etc. In other words, bodies 104 and/or apertures 118 may be dimensioned to accommodate some multiple of a desired product dimension. In some embodiments, one or more dividers 158 may be placed onto or under a workpiece, or between workpieces, to reach a desired thickness for pressing. The length, width, thickness, and composition of dividers 158 may vary among embodiments.

Figure 9A:
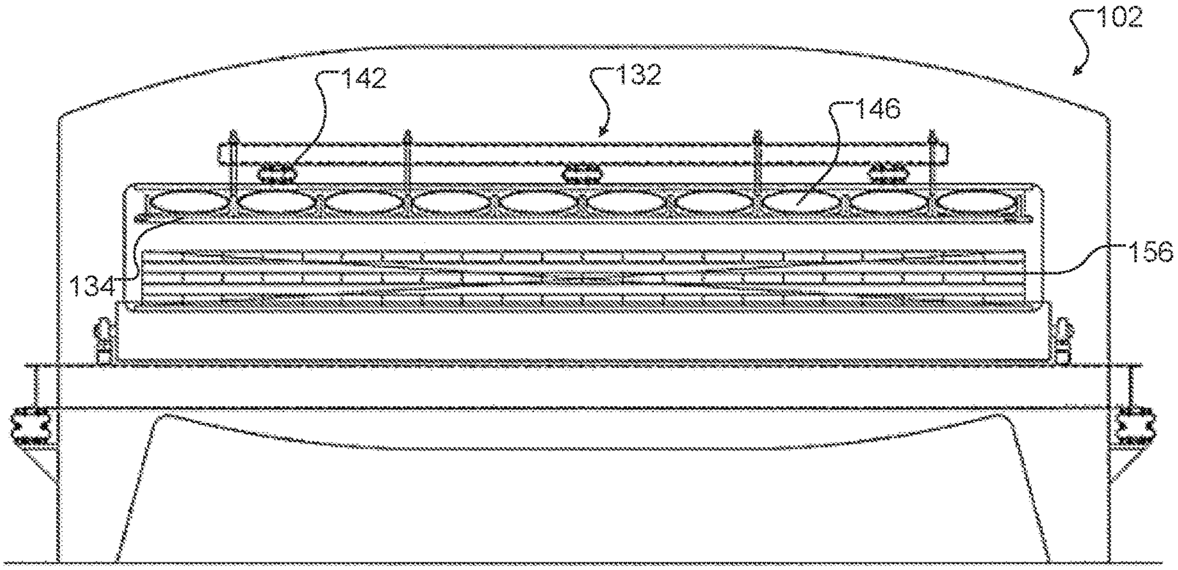
FIGS. 9A-C illustrate schematic views of a frame module and platen assembly with a removable spacer.
Figure 9B:
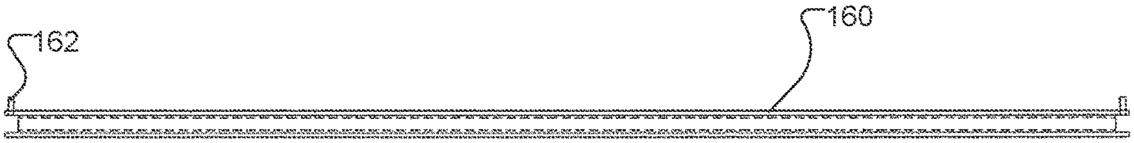
Figure 9C:
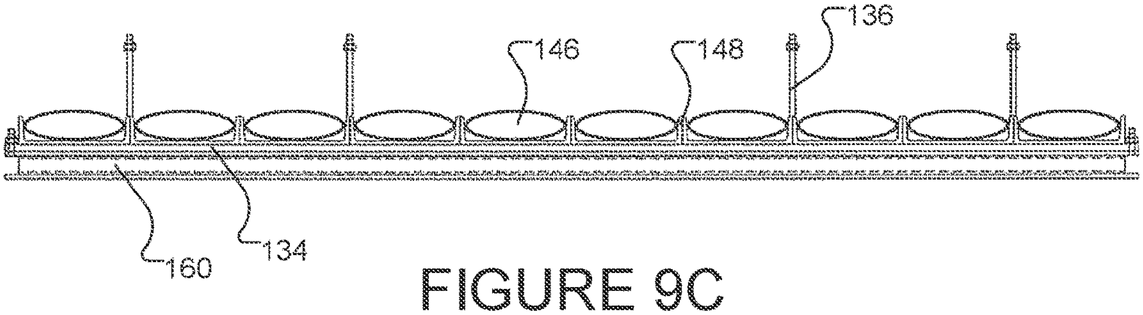

Alternatively, the platen assembly may include a spacer 160 that can be removably coupled with platen 134. FIGS. 9A-C illustrate schematic views of another embodiment of a frame module 102 with a platen assembly 132 that includes a removable spacer 160, in accordance with various embodiments. As illustrated, in some embodiments the aperture of frame module 102 may be substantially rectangular with rounded/curved corners, and/or actuators 142 may be mounted to the upper platform (FIG. 9A). Spacer 160 may have couplers 162, such as holes, ring bolts, tabs, or other such features (FIG. 9B) configured to allow spacer 160 to be removably attached to platen 134 (FIG. 9C). In some embodiments, multiple spacers 160 of different thicknesses may be provided for use to press workpieces of different thicknesses. Optionally, spacers 160 may also be configured to be removably coupled to one another to collectively form a spacer of desired dimensions.

Actuators 146 and/or 142 may be operable to move platen 134 among several defined vertical positions and to maintain platen 134 in any of those positions for a desired length of time. Alternatively, actuators 146 and/or 142 may be operable to move platen 134 to, and maintain platen 134 in, virtually any vertical position within a range. The range may include a maximum vertical height (e.g., with actuators 142 fully extended/expanded/inflated and actuators 146 fully retracted/deflated), a minimum vertical height (e.g., with actuators 146 fully extended/expanded/inflated and actuators 142 fully retracted/deflated), and all possible vertical heights between the maximum and the minimum vertical heights.

Figure 10:
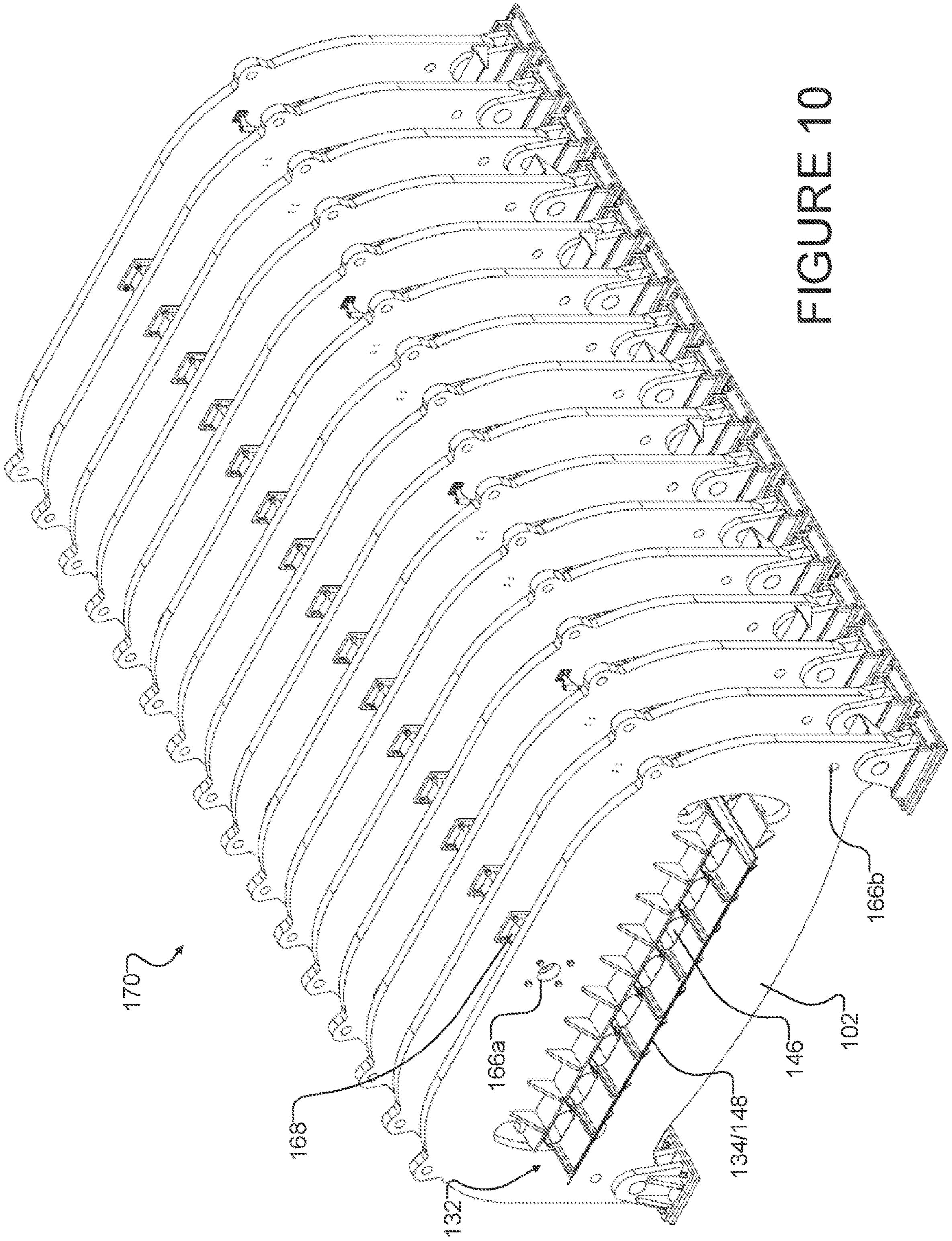
FIG. 10 illustrates a perspective view of a modular press with components removed to show additional detail.
Figures 11A, 11B:
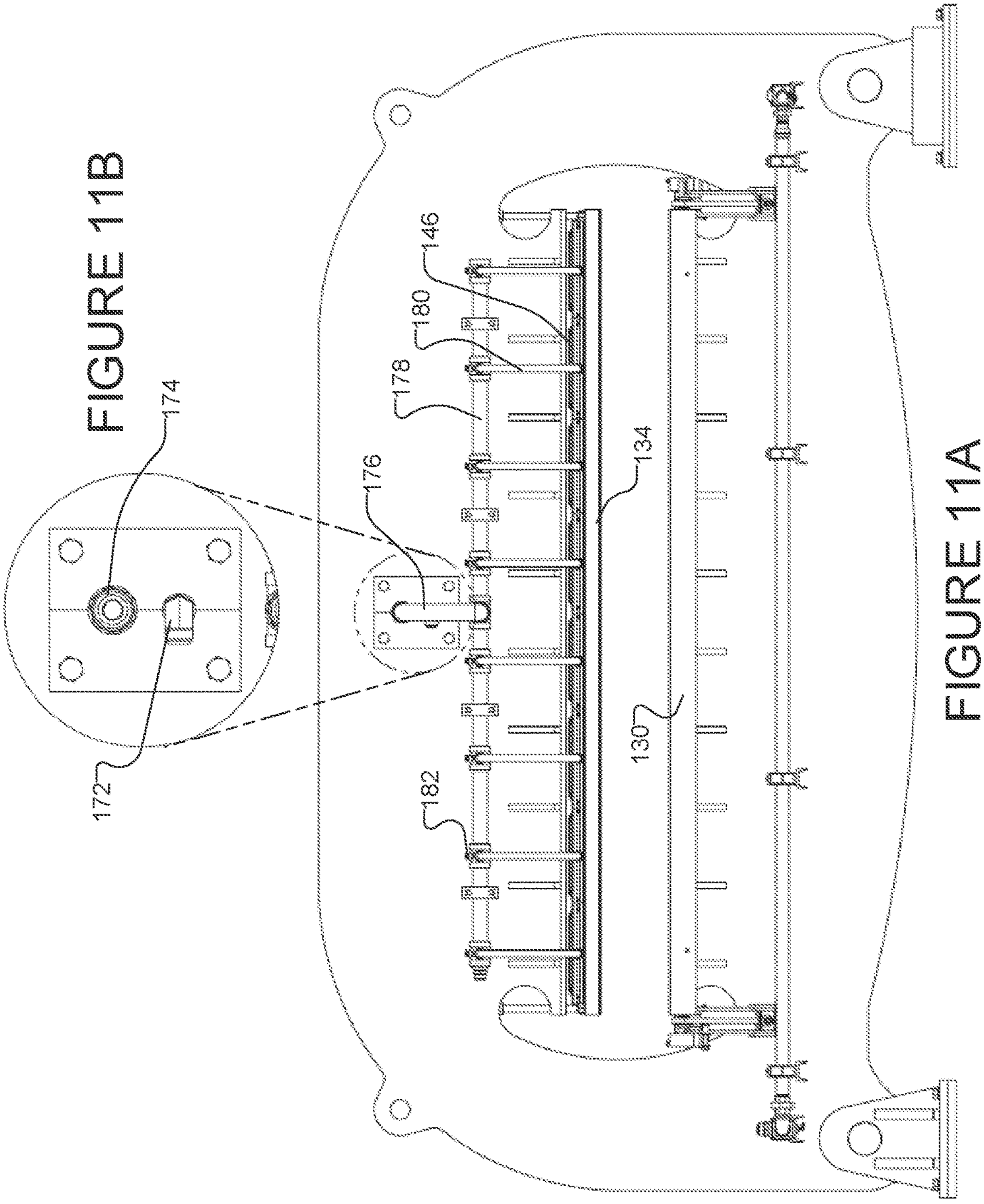
FIGS. 11A-B illustrate an end elevational view of a modular press (FIG. 11A) and an enlarged view of a portion thereof (FIG. 11B)

Referring now to FIG. 10, multiple frame modules 102 may be coupled together in axial alignment along the feed path axis to form a press frame 170. Platen assembly 132 may be coupled with press frame 170. In this Figure, some components are removed or cut away to show various details.

In various embodiments, platen 134, actuators 146, and/or supports 148 may be dimensioned for a press frame of a corresponding length. For example, platen 134 may include a single sheet of steel, or some other suitable material, that extends through all of the apertures 118 of the press frame 170.

In various embodiments, some or all of platen 134, actuators 146, and/or supports 148 may be modular. Press frame 170 may have two or more sections, each of which includes two or more consecutive frame modules 102, and platen 134 may be dimensioned to extend through the apertures 118 of the frame modules of one section. Thus, each of the sections may have a corresponding platen 134. For example, press frame 170 may include four consecutive sections, each with four frame modules 102, and each section may include a platen 134 dimensioned to extend through the four frame modules 102 of that section. Alternatively, platen 134 may be dimensioned to extend through two, three, five, six, or more than six frame modules 102. Similarly, platen 134 may be dimensioned to extend across some fraction (e.g., one half, one third, one fourth) of the width of the middle portion of aperture 118, and multiple platens 134 may be arranged side-by-side. Optionally, actuators 146 and/or supports 148 may be configured to match the dimensions of the corresponding platen(s) 134 on which they are supported. For instance, a modular press with four sections of four frame modules per section may include actuators 146 and supports 148 dimensioned to extend through, or substantially through, one section (four frame modules 102). This may allow the modular press to be lengthened or shortened to suit the end user's needs. Combinations are also possible, such as modular platens with full-length actuators/supports (e.g., for more convenient shipping/handling) or full-length platens with modular actuators/supports (e.g., for more convenient replacement or repair of those components, and/or to allow the press to continue operation if one or a few actuators is damaged).

Alternatively, platen 134, supports 148, and/or actuators 146 may be constructed/dimensioned to extend through all of the apertures 118 of the press frame 170.

In either case, in some embodiments the actuator(s) 146 of one platen 134 may be controllable independently of the actuator(s) 146 of another platen 134, such that fewer than all of the platens 134 are used to press a workpiece in a particular press cycle. For example, two modular presses (e.g., two modular presses 100), each with a corresponding actuator system, may be positioned end-to-end to form a longer modular press with an upstream section and a downstream section that are controllable independently of one another. As another example, a modular press may have two platens 134 positioned on opposite sides of the feed path axis, each with corresponding actuators 146 that extend through all of the apertures of the press frame, and the actuator(s) of one platen may be controllable independently of the actuator(s) of the other platen. Again, two such presses (each with two independently controlled platens) may be positioned end-to-end to form a longer modular press with two upstream sections and two downstream sections that are independently controllable. These examples are provided merely by way of illustration, and other combinations are also possible. Thus, in some embodiments full-length and/or full-width workpieces may be pressed by actuating all of the actuators 146, and shorter/narrower workpieces may be pressed by actuating only some of the actuators 146. In other embodiments, actuators 146 may be controlled collectively rather than independently, and workpieces of less than the full length/width may be pressed by using spacers of appropriate dimensions positioned along one or both ends/sides of the workpieces to offset the difference.

Referring again to FIG. 10, in various embodiments frame modules 102 may be provided with a through-hole **166*a* dimensioned to accommodate air/fluid conduits, electrical wiring, or the like. In some embodiments, through-hole 166*a* may be located above upper platform 110 along a vertical centerline of the corresponding frame module 102. Frame modules 102 may be coupled together by connectors 168, such as steel beams, plates, or other rigid and durable material. Optionally, connectors 168 may be hollow structures with an interior void, and may be coupled at opposite ends to adjacent frame modules 102 such that the interior voids and holes 166*a* are in axial alignment. This configuration may provide structural stability as well as a passage through press frame 170** for the conduits, wiring, etc.

In a particular embodiment, actuators 142 and 146 may be pneumatic actuators, and air may be supplied to them via corresponding air conduits that extend through the press frame 170. Referring now to 11A-B, conduits 172 and 174 may be disposed within the through-holes **166*a* and connectors 168. Conduit 172 may be operatively coupled with actuators 142, and conduit 174 may be operatively coupled with actuators 146. Conduits 172 and 174 may be operatively coupled to a source of pressurized air, as described further below. Conduit 174 may extend from the outer face of the first frame module 102 to the opposite outer face of the last frame module 102. At one or both ends, conduit 174 may be connected to a series of additional conduits 176, 178, 180. Conduit 178 may extend laterally along the outer face of the frame module, and may be connected to conduit 174 by conduit 176. Each conduit 180 may be connected at opposite ends to conduit 178 and a corresponding one of the actuators 146. Collectively, conduits 174, 176, 178, and 180 may be operatively connected to the source of pressurized air, and may form a passage through which air can be introduced into, and/or removed from, actuators 146**.

Conduits 174, 176, 178, and 180, and/or other conduits in any suitable number and arrangement, may be provided at only one end of modular press 100. Alternatively, such conduits may be provided at both ends of modular press 100, and/or at predetermined increments along the length of modular press 100 (e.g., every four frame modules), and each group of conduits may be coupled to the same or different source of pressurized air. This may allow actuators 146 to be filled with air from both ends of the actuators simultaneously, which may in turn provide faster inflation and deflation of the actuators. Optionally, valves 182 may be provided between and/or along any of the conduits to control airflow.

Figures 12A, 12B, 12C, 12D:
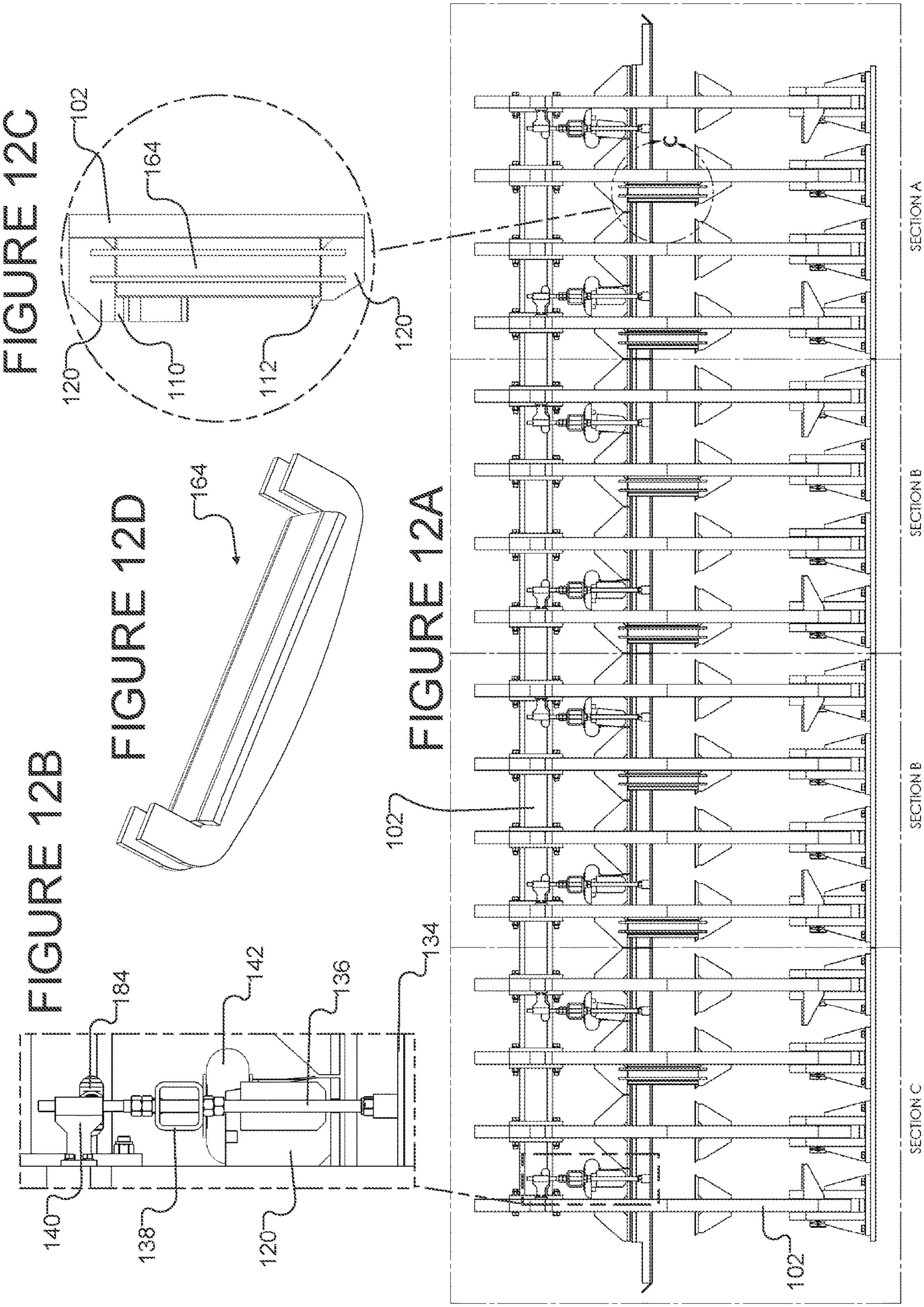
FIGS. 12A-D illustrate a schematic side elevational view of a modular press (FIG. 12A) and portions thereof (FIGS. 12B-12E)

Similarly, conduit 172 may be coupled at one or both of its opposite ends to the source(s) of pressurized air via other conduits (not shown) in the same or similar manner. Additional conduits may operatively connect conduit 172 to actuators 142. Referring now to FIG. 12A, which shows a side elevational view of press frame 170, frame modules 102 may be grouped into sections generally as discussed above. Each section may include a corresponding platen assembly 132 with actuators 142. In the illustrated embodiment, each section has four frame modules 102. However, in other embodiments, a section have two, three, five, six, or more than six frame modules 102.

Figure 13B:
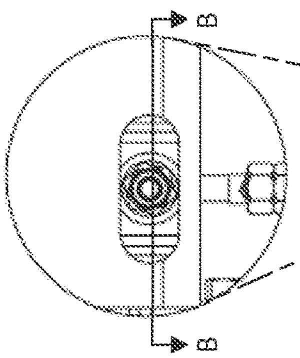
FIGS. 13A-D illustrate another schematic side elevational view of a modular press (FIG. 13A) and a portion thereof (FIG. 13B)
Figure 13C:
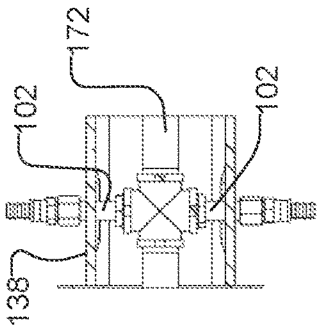

In some embodiments, actuators 142 may be coupled to the end-most frame modules 102 of each section. Other arrangements are also possible, and in other embodiments actuators 142 may be coupled to the inner-most frame modules of each section, to each of the frame modules, to every second frame module, or arranged in any other suitable manner. Regardless, each actuator 142 may be operatively coupled with conduit 172. For example, conduit 172 may be provided with connectors 184 at locations that correspond to the locations of actuators 142 (FIG. 12A; see also FIGS. 13A-B, with support 120 removed to reveal a connector 184, and FIG. 14A, showing a sectional view taken along lines A-A of FIG. 13A). Connectors 184 may have nozzles 186 (see FIG. 13C, taken along lines B-B of FIG. 13A), and additional conduits may connect each nozzle 186 to a corresponding actuator 142.

Figure 13A:
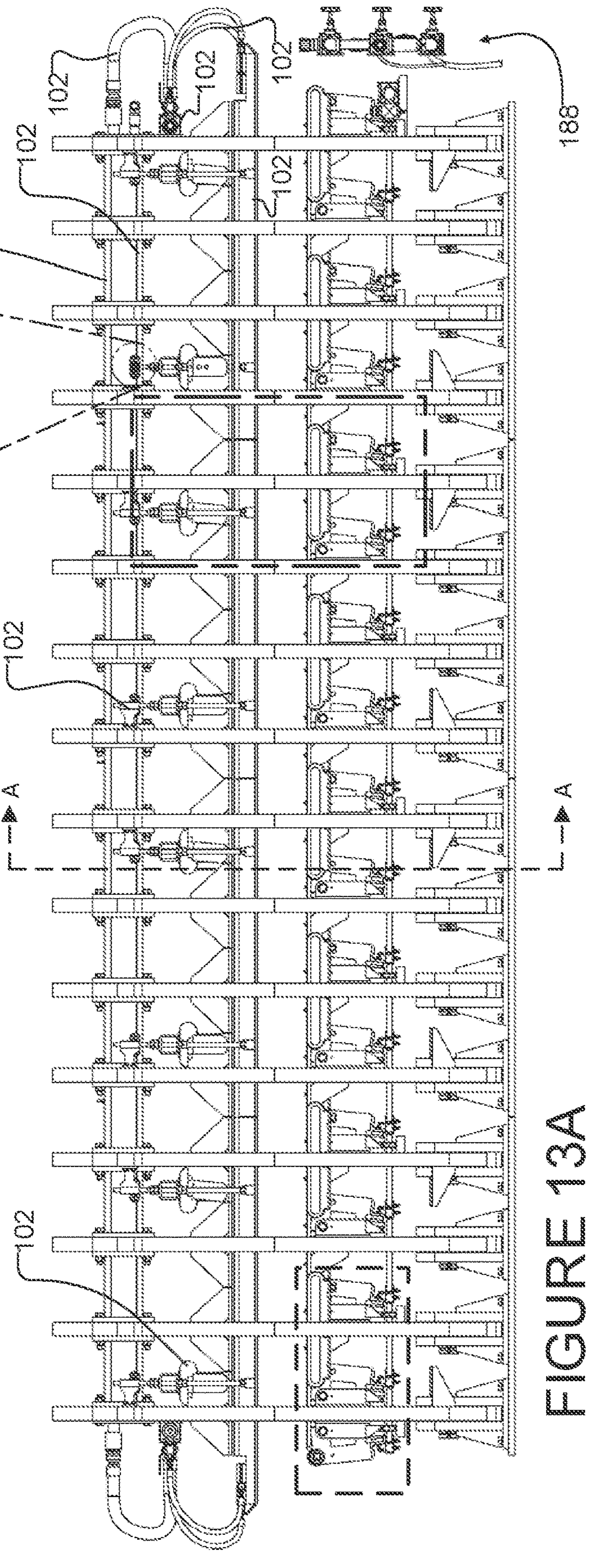
Figure 13D:
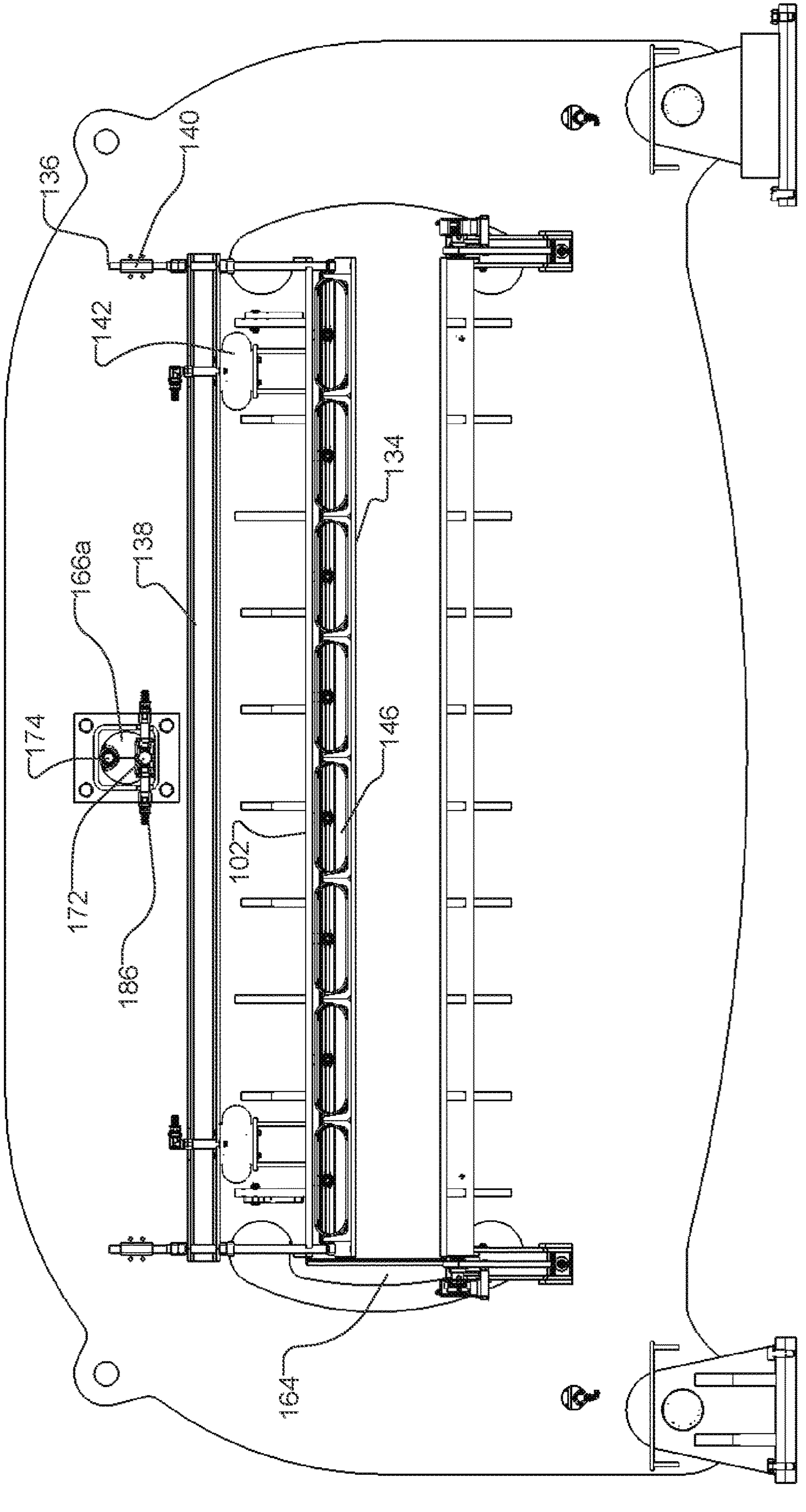
Figure 14A:
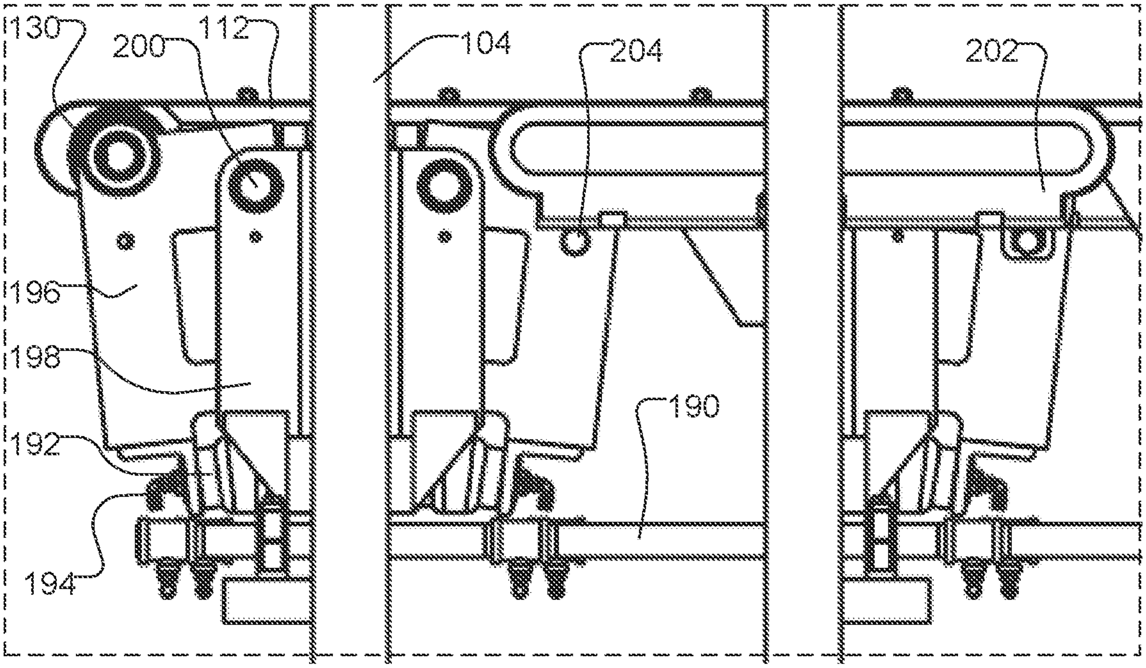
FIGS. 14A-B illustrate enlarged views of portions of the modular press of FIG. 13A.
Figure 14B:
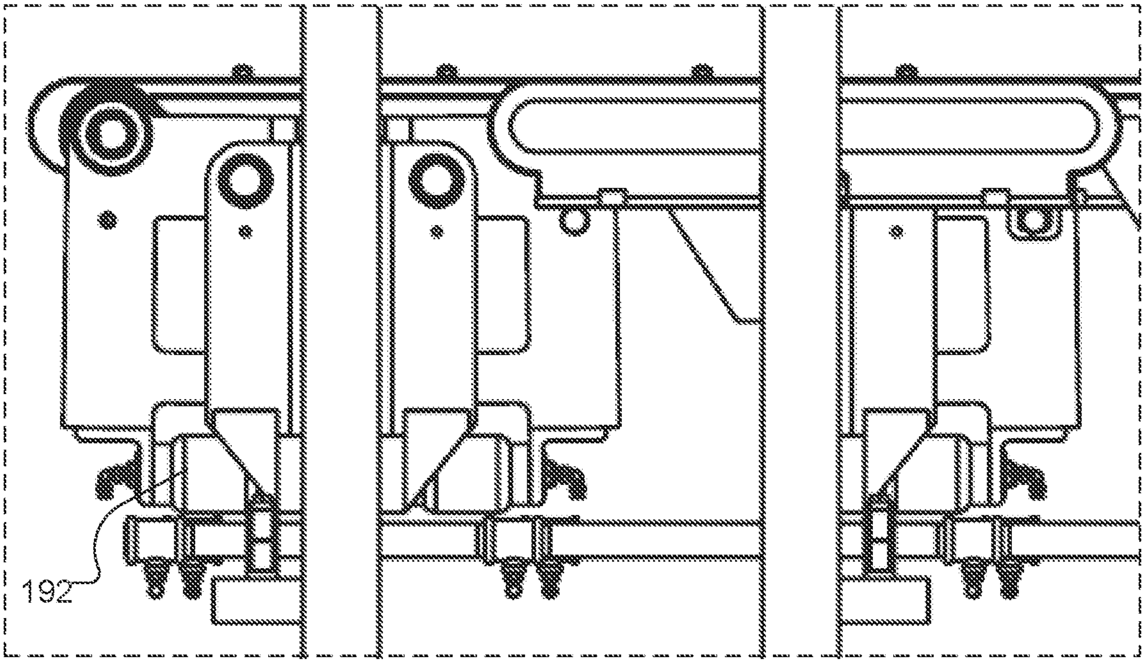

Optionally, conduits 172 and 174 may be coupled to corresponding outlets of a single source of pressurized air 188 (FIG. 13A). Each of the outlets may be controllable independently of the others. For example, conduits 172 and 174 may be coupled to corresponding first and second outlets, respectively, of the source of pressurized air 188. The outlets may be controlled such that when air is being supplied to conduit 172, airflow to conduit 174 is blocked, and vice versa. Alternatively, the outlets may be controlled based on pressure to provide desired airflow to each conduit simultaneously.

As shown in FIGS. 12A and 12C-D, in various embodiments some or all of the frame modules 102 may include abutment members 164 rigidly coupled to the platforms 110, 112 and/or body 102. For example, in some embodiments abutment members 164 may be provided in an alternating fashion (e.g., every second, third, or fourth frame module 102). In other embodiments, some frame modules may have an abutment member 164, and other frame modules may have actuators 142. In still other embodiments, some frame modules may have both an abutment member 164 and actuators 142, or neither. Some embodiments may lack abutment members 164.

Transport Assembly

Some modular presses may include a transport system/assembly. FIG. 13A shows a side elevational view of one such embodiment, with components of transport assembly enclosed in broken lines, enlarged in FIG. 14A.

Referring now to FIG. 14A, a conduit 190 may be disposed through holes 166*b* (see FIG. 10) on each of the opposite sides of the press frame 170. Conduit 190 may be coupled to actuators 192 and to the source of pressurized air 188. While actuators 192 are shown as air bags in the illustrated embodiment, other embodiments may have other types of actuators instead of, or in addition to, air bags, and corresponding types of conduits (or no conduits). Examples of other actuators include, but are not limited to, air cylinders, pneumatic cylinders, electric motor ball screws, planetary screws, springs, and eccentric wheels.

As shown in FIG. 4, consecutive frame modules 102 may have corresponding lower platforms 112, and the frame modules may be arranged such that each lower platform 112 is spaced apart from the next by a gap. Conveyor rolls 130 may be disposed within some or all of the gaps between the lower platforms 112. Optionally, a conveyor roll may be positioned upstream of the first lower platform 112, downstream of the last lower platform 112, or both.

Actuators 192 may be connected to a bottom portion of corresponding brackets 196, which may extend upwardly above actuators 192. The upper portion of brackets 196 may be coupled at opposite ends to a conveyor roll 130 and a support 198. Each bracket 196 may be pivotably coupled to the corresponding support 198, such as by a pivot member 200. Thus, each conveyor roll 130 may be coupled at its opposite ends to a pair of brackets 196 and a pair of actuators 192. Optionally, in embodiments with conveyor rolls upstream of the first lower platform 112 and/or downstream of the last lower platform 112, the brackets for the first or last conveyor roll may be pivotably coupled to a the same support 198 as the next conveyor roll, but in the opposite orientation, such that they pivot in the opposite rotational direction around the corresponding pivot members 200.

Actuators 192 may be actuable to reposition conveyor rolls 130 between a resting position (FIG. 14A), in which an upper surface of the conveyor rolls is below an upper surface of lower platform 112, and a transport position (FIG. 14B), in which the upper surface of the conveyor rolls is elevated above the upper surface of lower platform 112.

Figure 15A:
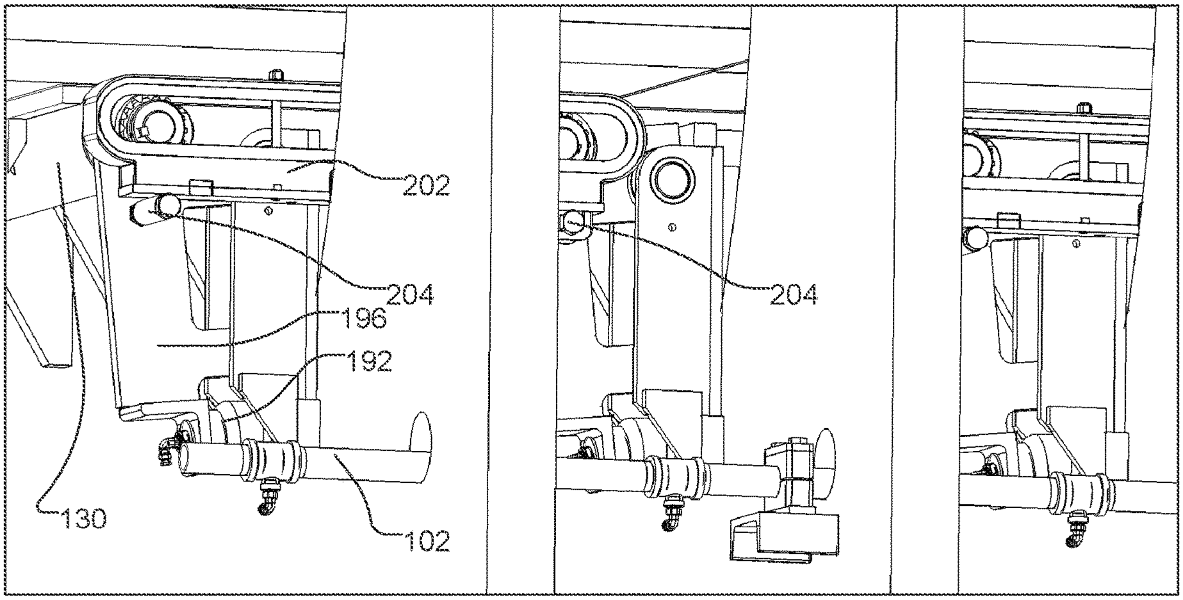
FIGS. 15A-C illustrate components of a transport assembly and a pressure regulator/compensator device for a modular press.
Figure 15B:
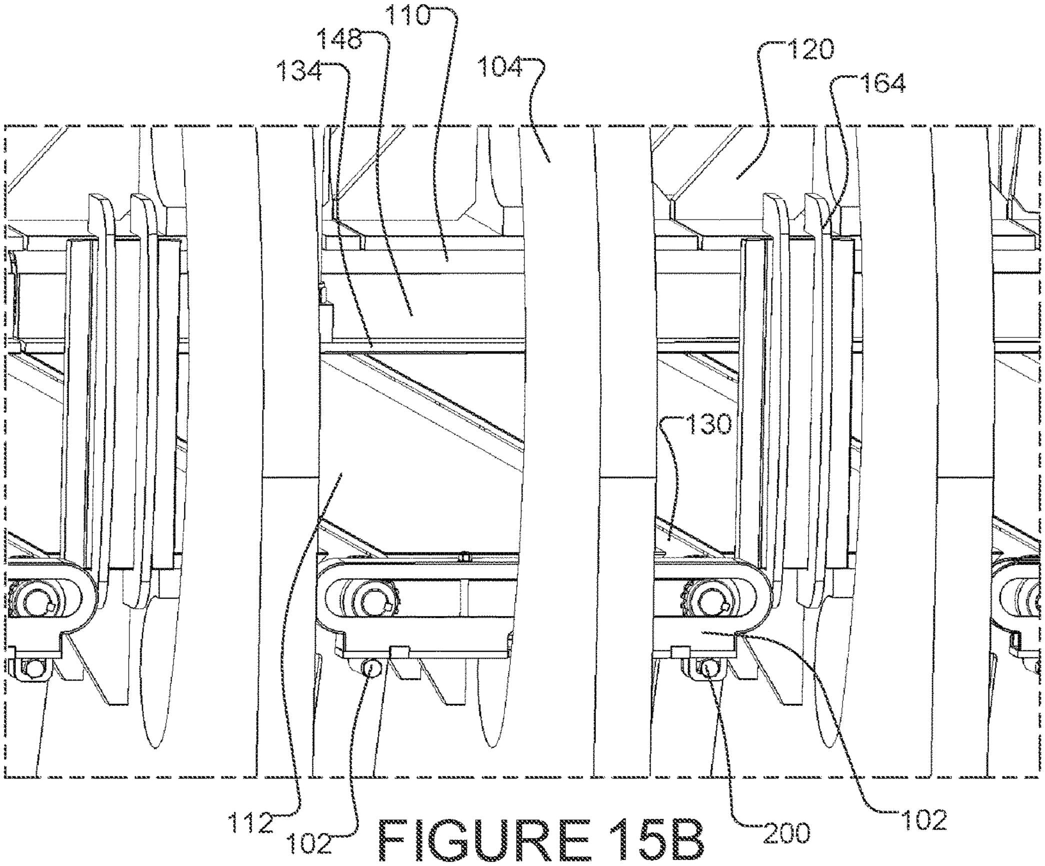

In some embodiments, some of the conveyor rolls 130 may be coupled together in groups and driven and/or moved vertically as a unit. For example, conveyor rolls 130 may be coupled together in groups of two (or more) by corresponding roll frames 202 (FIGS. 15A-B). Each of the opposite ends of roll frame 202 may be pivotably coupled to a corresponding one of the brackets 196, such that actuation of the corresponding actuators 192 raises and lowers the roll frame 202 and its conveyor rolls 130 as a single unit. In some embodiments brackets 196 may be provided with a projection 204, such as a pin or bolt, configured to support the roll frame 202. In any case, conveyor rolls 130 may be linked together by belt(s) or chain(s) driven by a common drive, or conveyor rolls 130 may be driven electrically, hydraulically, pneumatically, or in any other suitable manner, either individually or collectively.

Figure 15C:
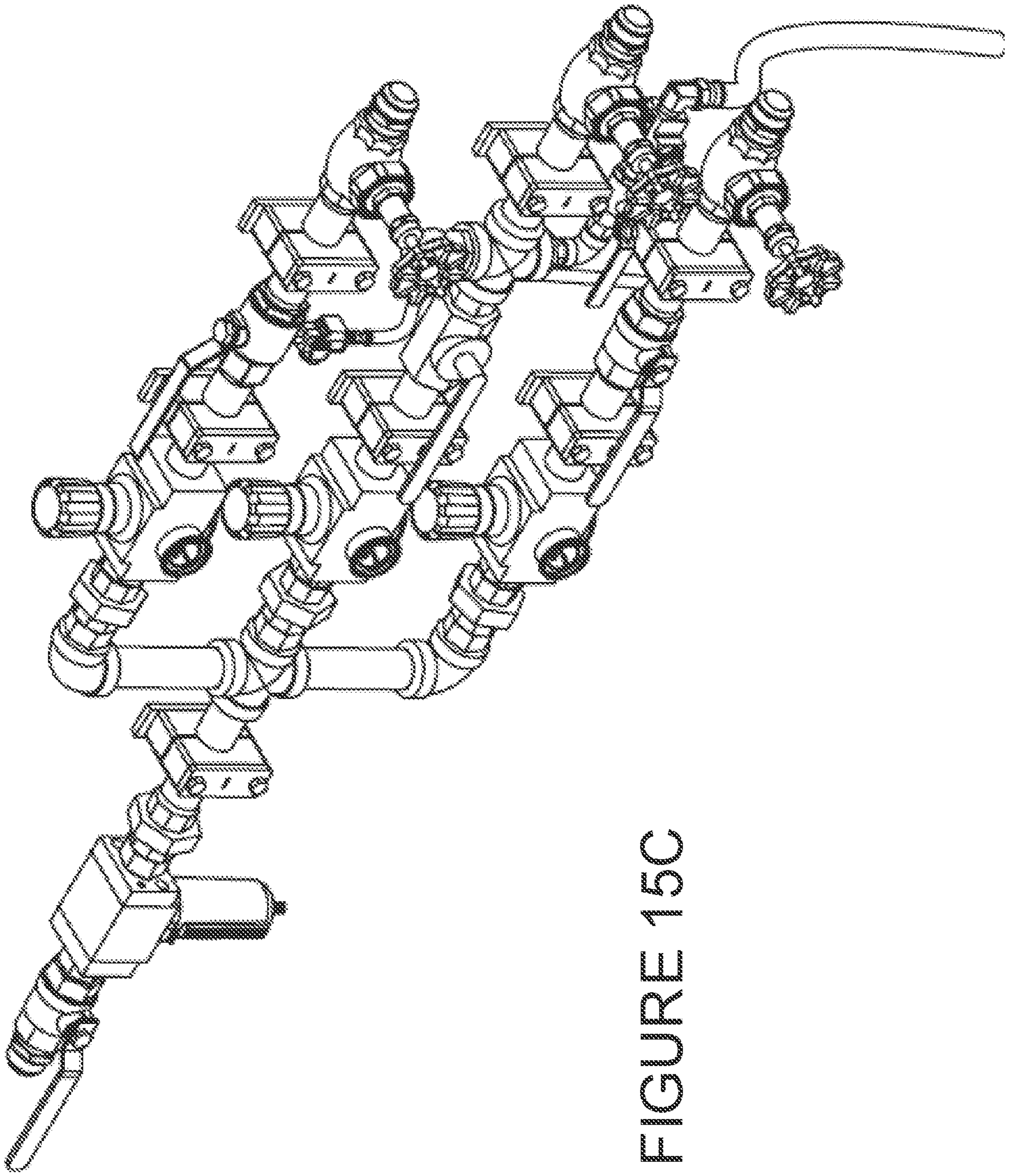
Figure 16A:
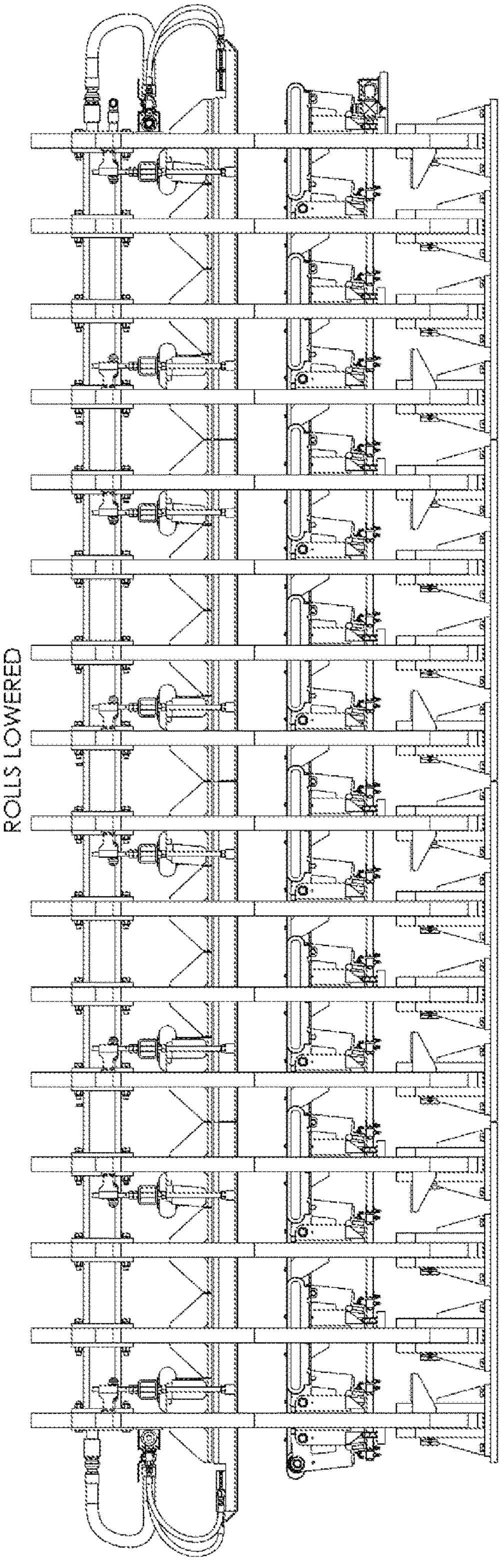
FIGS. 16A-16B illustrate schematic side elevational views of a modular press with a transport assembly, with transport rolls lowered (FIG. 16A) and raised (FIG. 16B)
Figure 16B:
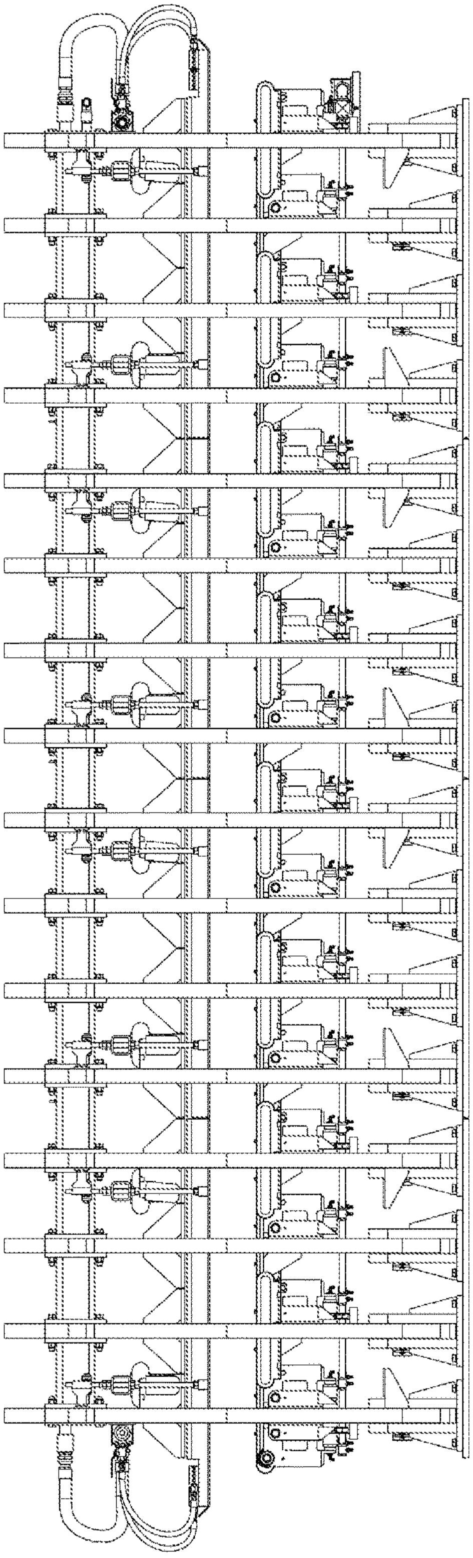

In various embodiments, actuators 142, 146, and 192 may be pneumatic actuators such as airbags or air hoses, and corresponding conduits 172, 174, and 190 may be coupled to corresponding outlets of a source of pressurized air, which may include pressure regulator/compensator mechanisms configured to control airflow into, and air pressure within, the actuators. An example of such a device is shown in FIG. 15C.

In operation, actuators 192 may be extended, expanded, or inflated to raise the conveyor rolls to the transport position. The conveyor rolls may be driven in the direction of workpiece flow to convey a workpiece thereon into the modular press. Once the workpiece has been conveyed the desired distance into the modular press, the rotation of the conveyor rolls may be stopped, and actuators 192 may be retracted or deflated to lower the conveyor rolls to the resting position to deposit the workpiece onto the lower platform 112 (see FIG. 16A). The platen assembly 132 may be operated as described above to press the workpiece for the desired length of time. The platen may be moved vertically upward away from the workpiece, and the actuators 192 may be extended, expanded, or inflated again to raise the workpiece above lower platform 112 (see FIG. 16B). The conveyor rolls may be driven again in the same or opposite rotational direction to convey the workpiece out of the modular press.

Figure 17A:
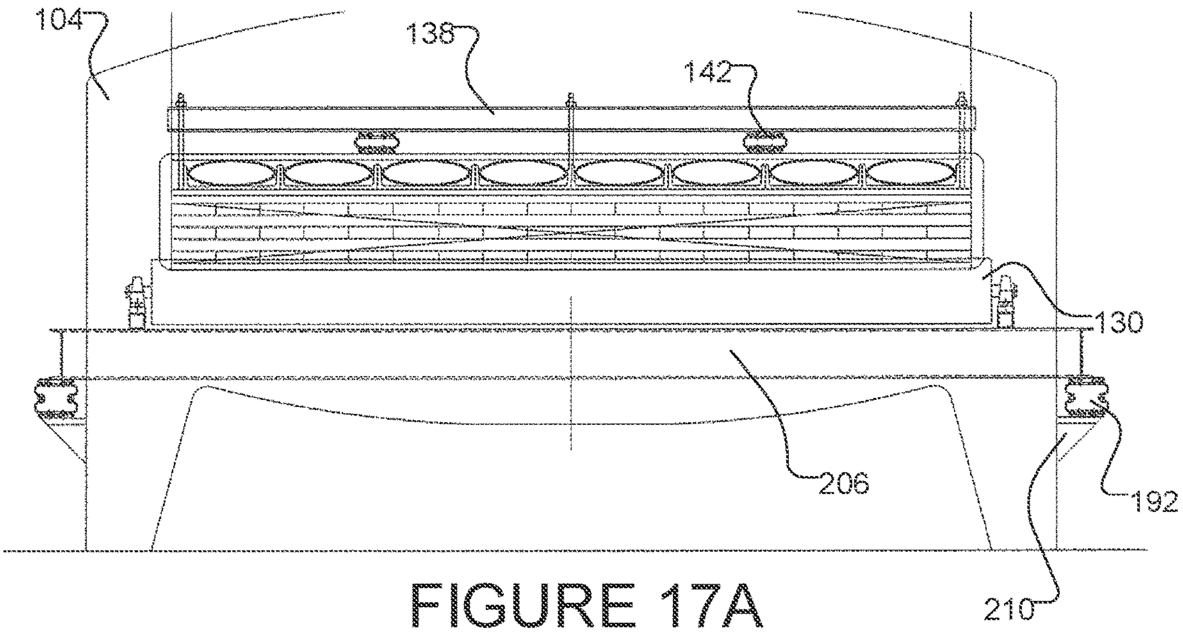
FIGS. 17A-B illustrate an alternative embodiment of a modular press with a transport assembly, all in accordance with various embodiments.
Figure 17B:
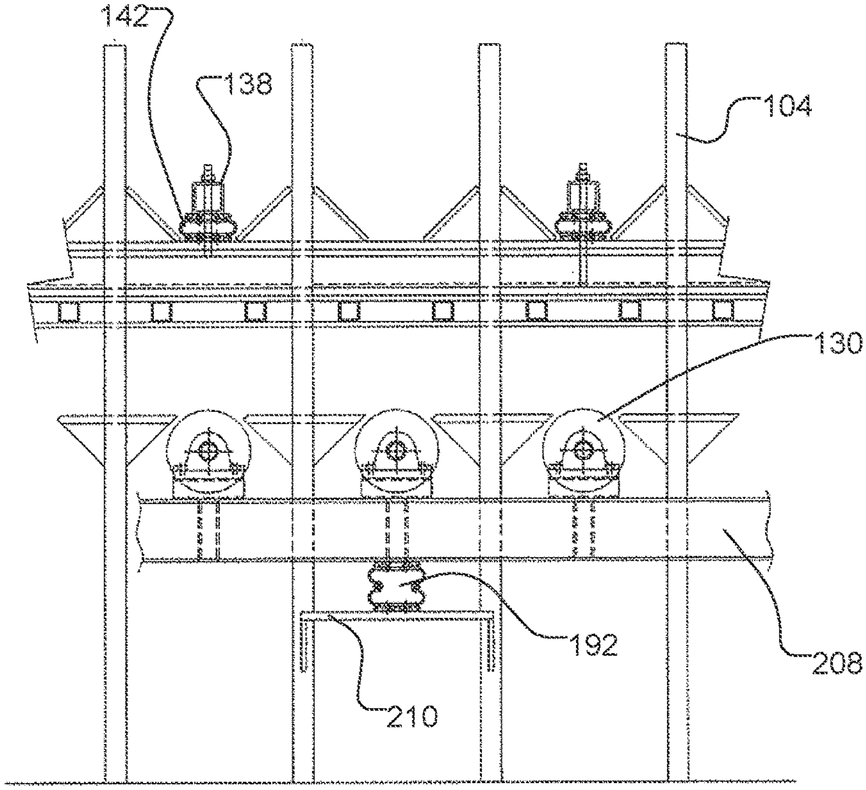

FIGS. 17A-B illustrate an alternative embodiment of a modular press and transport assembly, in accordance with various embodiments. As shown, in some embodiments rollers 130 may be mounted on lateral beams 206 and/or axial beams 208. Optionally, lateral beams 206 and axial beams 208 may be coupled together to form a single sub-frame or several modular sub-frames. In any case, actuators 192 may be disposed beneath the beams 206/208 on supports 210. Actuators 192 may be actuable to raise and lower the beams 206/208 to thereby raise and lower the conveyor rolls 130.

Operation

In various embodiments, a modular press may have a first set of actuators operable to exert force against the platen relative to the press frame, and a second set of actuators operable to exert force against the platen relative to the upper platform. The modular press may be operated generally as follows.

One or more workpieces may be moved into the opening of the press with the platen (e.g., platen 134) in the raised position. In some embodiments, the workpiece(s) may be deposited onto conveyor rolls (e.g., conveyor rolls 130), and the conveyor rolls may be rotated until the workpiece is in the desired position within the modular press. With the workpiece in position, the conveyor rolls may be stopped and lowered to deposit the workpiece onto the lower platform (e.g., platform 112). In a particular embodiment, the conveyor rolls may be raised and lowered by operating a third set of actuators that are operable to exert force against the conveyor rolls relative to the press frame or underlying floor. Optionally, the third set of actuators may be a set of pneumatic actuators such as air bags (e.g., actuators 192). In some embodiments, the workpiece(s) may also be pushed laterally against an abutment member generally as described above.

The upper platen may be moved downwardly into the intermediate position by retracting/deflating the first set of actuators (e.g., actuators 142). The upper platen may be moved to the intermediate position before, during, or after placement of the workpiece(s) onto lower platform 112. In some embodiments, the first set of actuators is a set of pneumatic actuators operatively coupled with a source of pressurized air. Optionally, these pneumatic actuators may be air bags, and may be inflated/deflated from either end of the press or from both ends simultaneously.

The second set of actuators (e.g., actuators 146) may be extended or inflated to move the platen downwardly, from the intermediate position to the engaging position, into engagement with the workpiece. The second set of actuators may be controlled to maintain the desired pressure (e.g., 150 psi, 100 psi, etc.) against the workpiece for the desired length of time. The desired length of time may be determined based on factors such as workpiece dimensions, wood/fiber type, adhesive type (e.g., cold set adhesives), temperature, humidity, desired product, and the like. In some embodiments, the second set of actuators is a set of pneumatic actuators, and the air pressure may be monitored and adjusted either manually or automatically during this portion of the press cycle to maintain or adjust the desired downward force. In some embodiments, the second set of actuators may be pneumatic actuators. Optionally, these pneumatic actuators may be air hoses, and the hoses may be inflated from one end or from both ends simultaneously.

When the desired length of time has elapsed, the second set of actuators may be retracted or deflated to return the platen to the intermediate position. The first set of actuators may be extended or inflated to return the platen 134 to the raised position. The workpiece(s) may be moved out of the modular press once the platen is returned to the raised position, or while the platen is being returned to the raised position. In embodiments with conveyor rolls, the workpiece (s) may be moved out of the modular press by raising the conveyor rolls to lift the workpiece(s) above the lower platform and rotating the conveyor rolls until the workpiece has exited the press.

In various embodiments, a modular press may be constructed generally as follows. A plurality of generally planar bodies (e.g., bodies 104) may be formed, each with a corresponding aperture (e.g., aperture 118) that extends through opposite faces of the planar body. The bodies and/or apertures may have one or more curved portions. The bodies may be provided with corresponding upper and lower platforms coupled to the bodies along the upper and lower portions, respectively, of the apertures to form frame modules (e.g., frame modules 102). The bodies/frame modules may be coupled together in axial alignment to form a press frame, such that the apertures collectively define a feed path extending through the bodies. (Upper/lower platforms may be coupled to the bodies before or after the bodies are coupled to one another.) A platen may be movably coupled with the upper platform and the frame modules, such that the platen is coplanar with the feed path and the upper and lower platforms. A first actuator system may be coupled with the platen and the upper platform to selectively reposition the platen vertically relative to the bodies. A second actuator system may be coupled with the platen and the frame modules to selectively reposition the platen vertically relative to the upper platform. Optionally, a plurality of conveyor rolls may be coupled with the frame modules and disposed between adjacent ones of the lower platforms, and a third actuator system may be coupled with the conveyor rolls to selectively raise and lower the conveyor rolls. Some or all of the actuator systems may be coupled with a source of pressurized air or other pressurized fluid.

A modular press may be modified generally as follows. To extend the modular press, one or more additional frame modules may be coupled with the modular press, such that the existing press and additional frame module(s) are in axial alignment. Again, the upper and lower platforms may be coupled to the body(ies) before or after coupling the body(ies) to the existing press. A platen may be coupled to the additional frame module(s). The platen may be provided in addition to, or place of, an existing platen of the modular press. One or more of the existing actuator systems of the modular press may be extended by coupling additional actuators with the added frame module(s) and the existing actuator system. Alternatively, an existing actuator system that includes hoses (e.g., actuators 146) may be extended by replacing some or all of the existing hoses with longer hoses. Likewise, a modular press may be reduced in length by uncoupling one or more frame modules and corresponding components (e.g., corresponding actuators and/or conveyor rolls) from the modular press, and removing or replacing the platen with another of appropriate size. In some embodiments, modifying the modular press may include replacing an existing actuator system with a pneumatic actuator system or other type of actuator system.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A press frame module comprising:

a substantially planar body with opposite faces, an outer edge, and an inner edge, wherein the inner edge defines an opening that extends through the body, and the outer edge defines a top, a bottom, and opposite first and second ends of the body; and a base assembly pivotably coupled to the body and configured to support the body on an underlying support surface, wherein the base assembly includes a first base pivotably coupled with the first end of the body and a pedestal coupled with the first base, and wherein the pedestal is configured to permit horizontal movement of the first base in a first direction generally parallel to the faces of the body while restricting horizontal movement of the first base in a second direction generally perpendicular to the faces of the body.

2. The press frame module of claim 1, wherein the base assembly includes a second base pivotably coupled with the second end of the body and a second pedestal coupled with the second base, and wherein the second pedestal is configured to permit horizontal movement of the second base in the first direction while restricting horizontal movement of the second base in the second direction.

3. The press frame module of claim 1, wherein the base assembly further includes a second base pivotably coupled with the second end of the body, the first and second bases are positioned on opposite sides of a vertical centerline of the body, and the second base is configured to be fixedly coupled with the underlying support surface.

4. The press frame module of claim 3, wherein the body has an outer contour that is generally linear along portions of the top and the opposite ends of the body and curved between the generally linear portions of the top and the opposite ends of the body.

5. The press frame module of claim 1, wherein the base assembly further includes a second base, the body defines first and second projections along the bottom at or near the opposite ends of the body, and the first and second bases are pivotably coupled to the first and second projections, respectively.

6. The press frame module of claim 5, wherein a portion of the bottom between said projections is curved in contour such that a greatest vertical distance between a longitudinal centerline of the body and the portion of the bottom between the projections is along the vertical centerline of the body.

7. The press frame module of claim 6, wherein the body has an outer contour that is generally linear along a portion of the top, along a portion of the first end, and along a portion of the second end.

8. The press frame module of claim 7, wherein the outer contour of the body is curved between said portions of the top and the ends.

9. The press frame of claim 5, wherein the body includes a first hole that extends through the first projection, the base assembly includes a first pivot member, and the first pivot member is disposed through the first hole and the first base.

10. The press frame of claim 9, wherein the base assembly further includes a second pivot member and the second base is pivotably coupled to the second projection by the second pivot member.

11. The press frame module of claim 10, wherein the base assembly further includes a base support configured to support the second base thereon and to restrict movement of the second base in the second direction.

12. The press frame module of claim 1, wherein a first and a second portion of the inner edge extend horizontally above and below a longitudinal centerline of the opening, respectively, the first and second portions of the inner edge defining a middle portion of the opening.

13. The press frame module of claim 12, wherein a third portion and a fourth portion of the inner edge define corresponding end portions of the opening, and wherein at least part of the third and fourth portions of the inner edge are curved.

14. The press frame module of claim 13, wherein each of the third and fourth portions of the inner edge describes a corresponding multiradial curve.

15. The press frame module of claim 14, wherein each of the multiradial curves includes a first arc and a second arc.

16. The press frame module of claim 15, wherein the radius of the first arc is above the first portion of the inner edge, and the radius of the second arc is below the second portion of the inner edge.

17. The press frame module of claim 16, wherein the radius of the first arc is vertically aligned with the radius of the second arc.

18. The press frame module of claim 12, further including an upper platform fixedly coupled to the first portion of the inner edger and a lower platform fixedly coupled to the second portion of the inner edge, wherein the platforms extend through the opening and perpendicular to the faces of the body, wherein the upper platform has a lower face and the lower platform has an upper face that is parallel to the upper face, and wherein the platforms and the inner edge collectively define an aperture.

19. The press frame module of claim 18, further comprising an abutment member that includes an abutment surface, wherein the abutment member is configured to be coupled to the body with the abutment surface extending perpendicular to the faces of the body and the faces of the platforms.

20. The press frame module of claim 18, further comprising:

a platen assembly, wherein the platen assembly includes a platen movably coupled with the body and extending through the opening; and an actuator system coupled to the platen and the body, wherein the actuator system is operable to move the platen vertically toward and away from the lower platform.

* * * * *